US005592190A

United States Patent [19]

Okada et al.

[11] Patent Number: 5,592,190

[45] Date of Patent: Jan. 7, 1997

[54] LIQUID CRYSTAL DISPLAY APPARATUS AND DRIVE METHOD

[75] Inventors: Shinjiro Okada, Isehara; Shuzo Kaneko, Yokohama; Yutaka Inaba, Kawaguchi; Katsuhiko Shinjo, Isehara; Hirokatsu Miyata, Yokohama; Kazunori Katakura, Atsugi, all of Japan

[73] Assignee: Canon Kabushiki Kaisha, Tokyo, Japan

[21] Appl. No.: 233,818

[22] Filed: Apr. 26, 1994

[30] Foreign Application Priority Data

| | | | |
|---|---|---|---|
| Apr. 28, 1993 | [JP] | Japan | 5-123233 |
| May 21, 1993 | [JP] | Japan | 5-141268 |

[51] Int. Cl.[6] .......... G02F 1/133

[52] U.S. Cl. .......... 345/89; 345/97; 345/101

[58] Field of Search .......... 345/89, 94, 95, 345/96, 97, 208, 209, 210, 147, 101; 359/56

[56] References Cited

U.S. PATENT DOCUMENTS

| | | | |
|---|---|---|---|
| 4,367,924 | 1/1983 | Clark et al. | 350/334 |
| 4,563,059 | 1/1986 | Clark et al. | 350/330 |
| 4,639,089 | 1/1987 | Okada et al. | 350/341 |
| 4,655,561 | 4/1987 | Kanbe et al. | 350/350 |
| 4,674,839 | 6/1987 | Tsuboyama et al. | 350/334 |
| 4,681,404 | 7/1987 | Okada et al. | 350/350 |
| 4,738,515 | 4/1988 | Okada et al. | 350/350 |
| 4,763,994 | 8/1988 | Kaneko et al. | 350/336 |
| 4,765,720 | 8/1988 | Toyono et al. | 350/350 |
| 4,778,260 | 10/1988 | Okada et al. | 350/350 |
| 4,800,382 | 1/1989 | Okada et al. | 340/784 |
| 4,815,823 | 3/1989 | Kaneko | 350/336 |
| 4,818,078 | 4/1989 | Mouri et al. | 350/350 |
| 4,824,218 | 4/1989 | Kuno et al. | 350/350 |
| 4,830,467 | 5/1989 | Inoue et al. | 350/333 |
| 4,836,656 | 6/1989 | Mouri et al. | 350/350 |
| 4,844,590 | 7/1989 | Okada et al. | 350/350 |
| 4,878,740 | 11/1989 | Inaba et al. | 350/337 |
| 4,902,107 | 2/1990 | Tsuboyama et al. | 350/350 |
| 4,906,072 | 3/1990 | Kaneko et al. | 350/333 |

(List continued on next page.)

FOREIGN PATENT DOCUMENTS

| | | |
|---|---|---|
| 0453856 | 10/1991 | European Pat. Off. . |
| 0449047 | 10/1991 | European Pat. Off. . |
| 0508227 | 10/1992 | European Pat. Off. . |
| A10510606 | 10/1992 | European Pat. Off. . |
| 0545400 | 6/1993 | European Pat. Off. . |
| 56-107216 | 8/1981 | Japan . |
| 63-29733 | 2/1988 | Japan . |
| 4-105285 | 4/1992 | Japan . |
| 4-218022 | 8/1992 | Japan . |

OTHER PUBLICATIONS

N. A. Clark, M. A. Handschy and S. T. Lagerwall, "Ferroelectric Liquid Crystal Electro–Optics Using the Surface Stabilized Structure," Mol. Cryst. Liq. Cryst., vol. 94, pp. 213–233 (1983).

*Primary Examiner*—Richard Hjerpe
*Assistant Examiner*—Kara Farnandez Stoll
*Attorney, Agent, or Firm*—Fitzpatrick, Cella, Harper & Scinto

[57] ABSTRACT

A liquid crystal display device having a matrix of pixels is driven for gradational display with better temperature compensation and better flicker suppression by a driving method, wherein (a) a first voltage signal is applied to a pixel on a selected scanning line, the first voltage signal including a clear pulse, a writing pulse of a polarity opposite to that of the clear pulse and a correction pulse of a polarity opposite to that of the writing pulse,(b) a second voltage signal is applied to an associated pixel on a subsequent scanning line, the second voltage signal including a clear pulse, a writing pulse and a correction pulse of which polarities are respectively opposite to corresponding pulses of the first voltage signal, and (c) the correction pulse applied to the pixel on the selected scanning line is determined based on gradation data for the associated pixel on the subsequent scanning line, and the writing pulse applied to the pixel on the selected scanning line is determined based on gradation data for the pixel on the selected scanning line and the above-determined correction pulse.

5 Claims, 21 Drawing Sheets

U.S. PATENT DOCUMENTS

| | | | |
|---|---|---|---|
| 4,917,470 | 4/1990 | Okada et al. | 350/333 |
| 4,923,285 | 5/1990 | Ogino et al. | 350/331 |
| 4,925,277 | 5/1990 | Inaba | 350/350 |
| 4,930,875 | 6/1990 | Inoue et al. | 350/333 |
| 4,932,759 | 6/1990 | Toyono et al. | 350/350 |
| 4,938,574 | 7/1990 | Kaneko et al. | 350/350 |
| 4,958,912 | 9/1990 | Inaba et al. | 350/333 |
| 4,958,915 | 9/1990 | Okada et al. | 350/345 |
| 4,973,135 | 11/1990 | Okada et al. | 350/334 |
| 5,026,144 | 6/1991 | Taniguchi et al. | 350/350 |
| 5,119,219 | 6/1992 | Terada et al. | 359/56 |
| 5,126,867 | 6/1992 | Ishiwata | 359/75 |
| 5,136,282 | 8/1992 | Inaba et al. | 340/784 |
| 5,153,755 | 10/1992 | Higa | 359/75 |
| 5,179,371 | 1/1993 | Yamazaki | 345/210 |
| 5,251,050 | 10/1993 | Kurematsu et al. | 359/57 |
| 5,267,065 | 11/1993 | Taniguchi et al. | 359/56 |
| 5,321,419 | 6/1994 | Katakura et al. | 345/97 |
| 5,379,138 | 1/1995 | Okada | 345/97 |
| 5,396,352 | 3/1995 | Kaneko et al. | 345/97 |
| 5,408,246 | 4/1995 | Inaba et al. | 345/97 |

FIG. 5(a) PRIOR ART
FIG. 5(b) PRIOR ART
FIG. 5(c) PRIOR ART
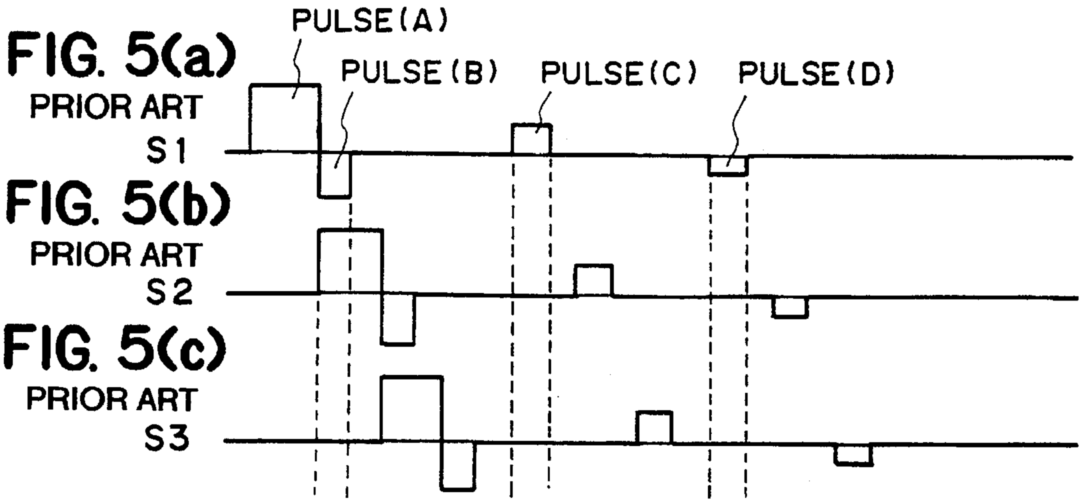
FIG. 5(d) PRIOR ART
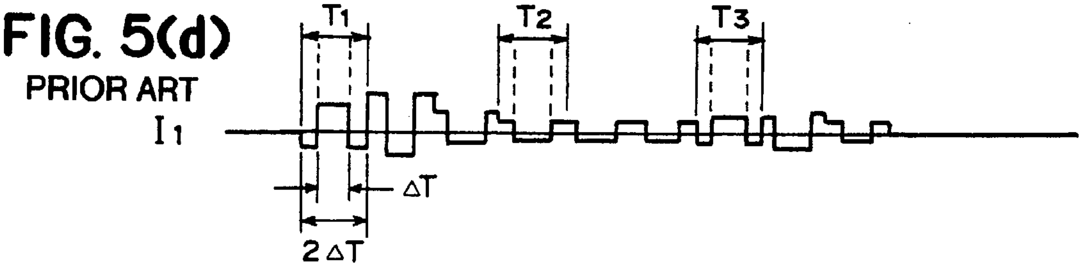
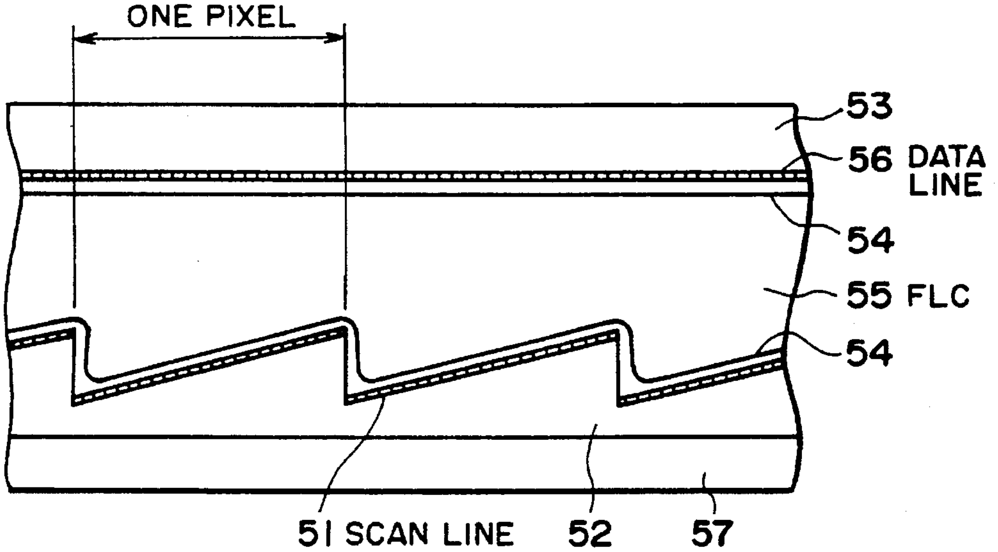
FIG. 6
PRIOR ART

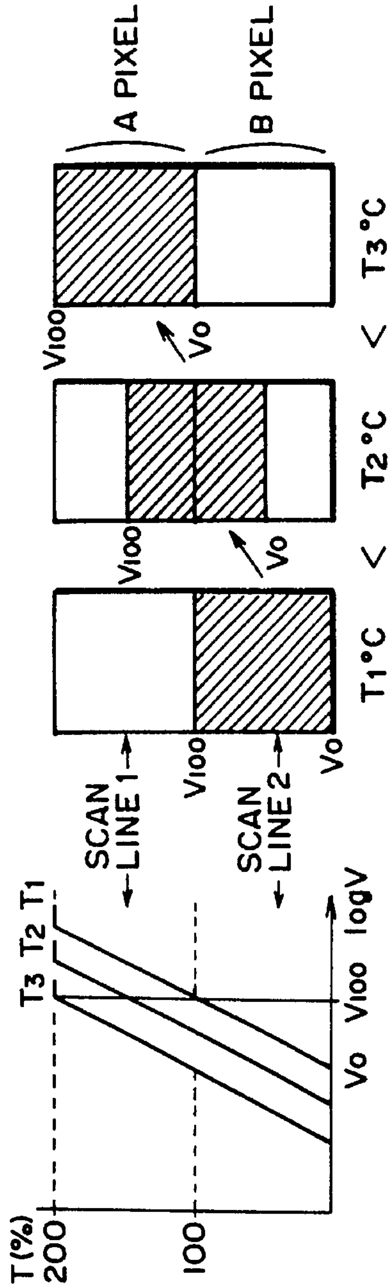
FIG. 8A PRIOR ART
FIG. 8B PRIOR ART
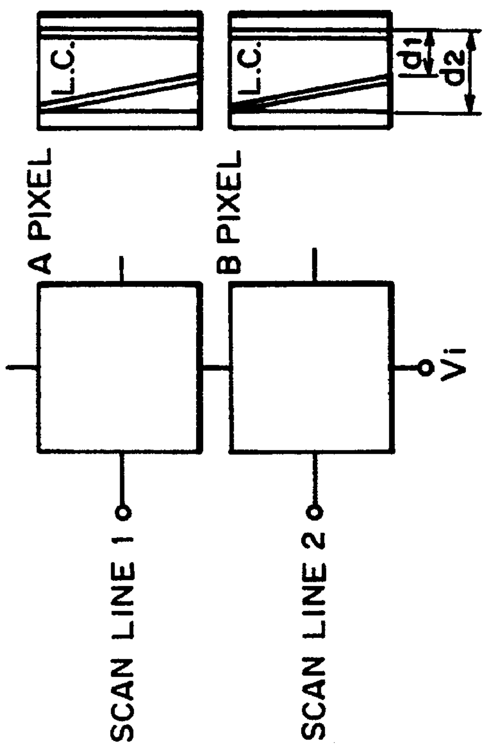
FIG. 9A PRIOR ART
FIG. 9B PRIOR ART

PIXEL CLEAR
1 ST WRITING
2 ND WRITING

A

B

C'
C

D'
D

| | | | | | | | | | | |
|---|---|---|---|---|---|---|---|---|---|---|
| FIG. 24(b) | 1 | 2 | 3 | 4 | 5 | 6 | 7 | 8 | 9 | 10 |
| FIG. 24(c) | 3 | 7 | 11 | 15 | 18 | 20 | 21 | 22 | 23 | 24 |
| FIG. 24(d) | VY1 | VY2 | 1 | | -3 | | 3 | | -1 | |
| FIG. 24(e) | VY1/3 | VY2/7 | 0.091 | 0.067 | -0.167 | -0.15 | 0.143 | 0.136 | -0.043 | -0.042 |
| FIG. 24(f) | | | 0.158 | | -0.315 | | 0.279 | | -0.085 | |
| FIG. 24(g) | | | 0.037 | | | | | | | |

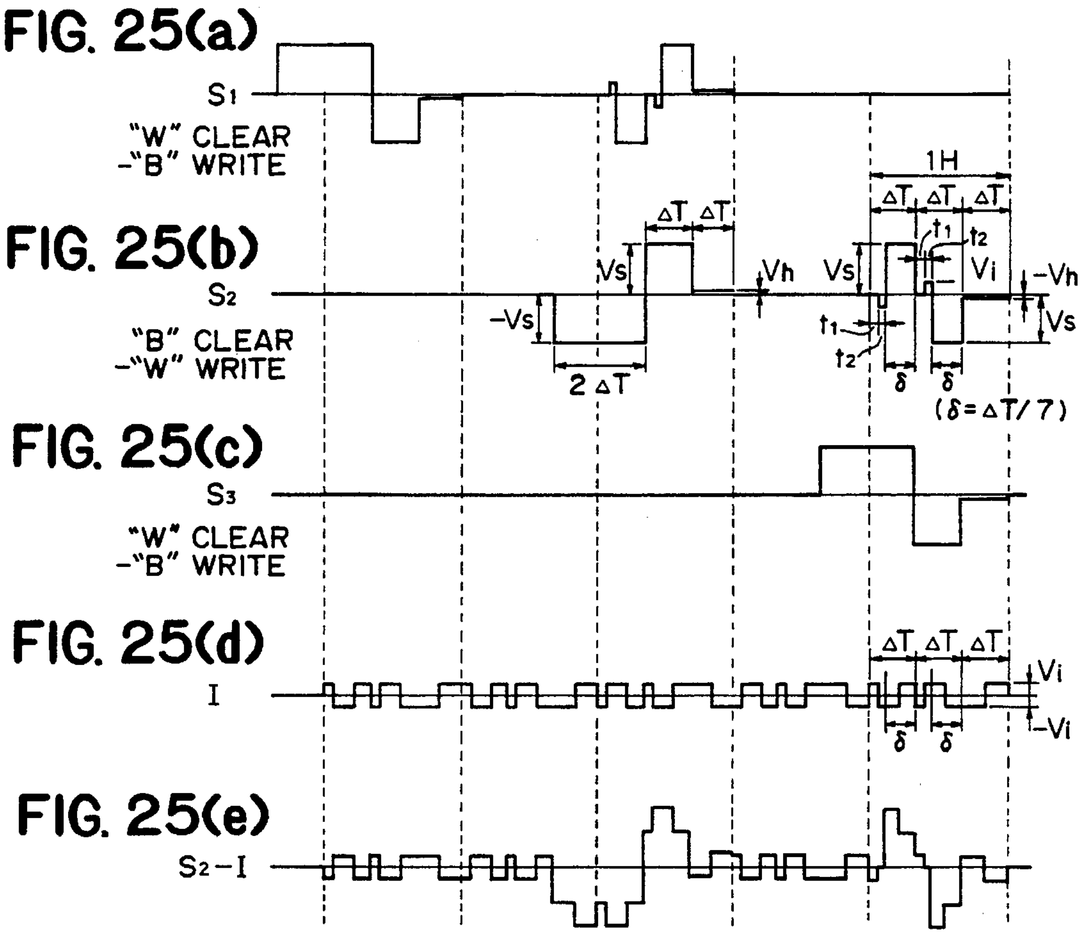
1H=3ΔT
Ve : CLEAR VOLTAGE Vs: SCAN SIGNAL VOLTAGE
Vi : DATA SIGNAL VOLTAGE
ΔT : 1ST. WRITING PERIOD
δ : 2ND. WRITING PERIOD (ΔT/γ)
t1, t2 : INITIAL PERIOD DETERMINED IN RELATION TO DATA SIGNAL

LIQUID CRYSTAL DISPLAY APPARATUS AND DRIVE METHOD

FIELD OF THE INVENTION AND RELATED ART

The present invention relates to a liquid crystal apparatus suitably used as a display apparatus for computer terminals, television receivers, word processors, typewriters, etc., inclusive of a light valve for projectors, a view finder for video camera recorders, etc., particularly such a liquid crystal apparatus using a ferroelectric liquid crystal (hereinafter sometimes abbreviated as "FLC") and a driving method therefor.

Clark and Lagerwall have disclosed a bistable FLC device using a surface-stabilized ferroelectric liquid crystal in, e.g., Applied Physics Letters, Vol. 36, No. 11 (Jun. 1, 1980), p.p. 899–901; Japanese Laid-Open Pat. Application (JP-A) 56-107216, U.S. Pat. Nos. 4,367,924 and 4,563,059. Such a bistable ferroelectric liquid crystal device has been realized by disposing a liquid crystal between a pair of substrates disposed with a spacing small enough to suppress the formation of a helical structure inherent to liquid crystal molecules in chiral smectic C phase (SmC*) or H phase (SmH*) of bulk state and align vertical (smectic) molecular layers each comprising a plurality of liquid crystal molecules in one direction.

Further, as a display device using such a ferroelectric liquid crystal (FLC), there is known one wherein a pair of transparent substrates respectively having thereon a transparent electrode and subjected to an aligning treatment are disposed to be opposite to each other with a cell gap of about 1–3 μm therebetween so that their transparent electrodes are disposed on the inner sides to form a blank cell, which is then filled with a ferroelectric liquid crystal, as disclosed in U.S. Pat. No. 4,639,089; 4,655,561; and 4,681,404.

The above-type of liquid crystal display device using a ferroelectric liquid crystal has two advantages. One is that a ferroelectric liquid crystal has a spontaneous polarization so that a coupling force between the spontaneous polarization and an external electric field can be utilized for switching. Another is that the long axis direction of a ferroelectric liquid crystal molecule corresponds to the direction of the spontaneous polarization in a one-to-one relationship so that the switching is effected by the polarity of the external electric field. More specifically, the ferroelectric liquid crystal in its chiral smectic phase show bistability, i.e., a property of assuming either one of a first and a second optically stable state depending on the polarity of an applied voltage and maintaining the resultant state in the absence of an electric field. Further, the ferroelectric liquid crystal shows a quick response to a change in applied electric field. Accordingly, the device is expected to be widely used in the field of, e.g., a high-speed and memory-type display apparatus.

A ferroelectric liquid crystal generally comprises a chiral smectic liquid crystal (SmC* or SmH*), of which molecular long axes form helixes in the bulk state of the liquid crystal. If the chiral smectic liquid crystal is disposed within a cell having a small gap of about 1–3 μm as described above, the helixes of liquid crystal molecular long axes are unwound (N. A. Clark, et al., MCLC (1983), Vol. 94, p.p. 213–234).

A liquid crystal display apparatus having a display panel constituted by such a ferroelectric liquid crystal device may be driven by a multiplexing drive scheme as described in U.S. Pat. No. 4,655,561, issued to Kanbe et al to form a picture with a large capacity of pixels. The liquid crystal display apparatus may be utilized for constituting a display panel suitable for, e.g., a word processor, a personal computer, a micro-printer, and a television set.

A ferroelectric liquid crystal has been principally used in a binary (bright-dark) display device in which two stable states of the liquid crystal are used as a light-transmitting state and a light-interrupting state but can be used to effect a multi-value display, i.e., a halftone display. In a halftone display method, the areal ratio between bistable states (light transmitting state and light-interrupting state) within a pixel is controlled to realize an intermediate light-transmitting state. The gradational display method of this type (hereinafter referred to as an "areal modulation" method) will now be described in detail.

FIGS. 1A and 1B constitute a graph schematically representing a relationship between a transmitted light quantity I through a ferroelectric liquid crystal cell and a switching pulse voltage V. More specifically, FIG. 1A shows plots of transmitted light quantities I given by a pixel versus voltages V when the pixel initially placed in a complete light-interrupting (dark) state is supplied with single pulses of various voltages V and one polarity as shown in FIG. 1B. When a pulse voltage V is below threshold Vth (V<Vth), the transmitted light quantity does not change and the pixel state is as shown in FIG. 2B which is not different from the state shown in FIG. 2A before the application of the pulse voltage. If the pulse voltage V exceeds the threshold Vth (Vth<V<Vsat), a portion of the pixel is switched to the other stable state, thus being transitioned to a pixel state as shown in FIG. 2C showing an intermediate transmitted light quantity as a whole. If the pulse voltage V is further increased to exceed a saturation value Vsat (Vsat<V), the entire pixel is switched to a light-transmitting state as shown in FIG. 2D so that the transmitted light quantity reaches a constant value (i.e., is saturated). That is, according to the areal modulation method, the pulse voltage V applied to a pixel is controlled within a range of Vth<V<Vsat to display a halftone corresponding to the pulse voltage.

However, actually, the voltage (V) — transmitted light quantity (I) relationship shown in FIG. 1 depends on the cell thickness and temperature. Accordingly, if a display panel is accompanied with an unintended cell thickness distribution or a temperature distribution, the display panel can display different gradation levels in response to a pulse voltage having a constant voltage.

FIG. 3 is a graph for illustrating the above phenomenon which is a graph showing a relationship between pulse voltage (V) and transmitted light quantity (I) similar to that shown in FIG. 1 but showing two curves including a curve H representing a relationship at a high temperature and a curve L at a low temperature. In a display panel having a large display size, it is rather common that the panel is accompanied with a temperature distribution. In such a case, however, even if a certain halftone level is intended to be displayed by application of a certain drive voltage Vap, the resultant halftone levels can fluctuated within the range of $I_1$ to $I_2$ as shown in FIG. 3 within the same panel, thus failing to provide a uniform gradational display state.

In order to solve the above-mentioned problem, our research and development group has already proposed a drive method (hereinafter referred to as the four pulse method") as disclosed in Japanese Laid-Open Patent Application (JP-A) 4-218022. In the four pulse method, as illustrated in FIGS. 4 and 5, all pixels having mutually different thresholds on a common scanning line in a panel are supplied with plural pulses (corresponding to pulses (A)–(D)

in FIG. 4) to show consequently identical transmitted quantities as shown at FIG. 4(D). In FIG. 5, $T_1$, $T_2$ and $T_3$ denote selection periods set in synchronism with the pulses (B), (C) and (D), respectively. Further, $Q_0$, $Q_{O'}$, $Q_1$, $Q_2$ and $Q_3$ in FIG. 4 represent gradation levels of a pixel, inclusive of $Q_O$ representing black (0%) and $Q_O'$ representing white (100%). Each pixel in FIG. 4 is provided with a threshold distribution within the pixel increasing from the left side to the right side as represented by a cell thickness increase.

Our research and development group has also proposed a drive method (a so-called "pixel shift method", as disclosed in U.S. patent application Ser. No. 984,694, filed Dec. 2, 1991 and entitled "LIQUID CRYSTAL DISPLAY APPARATUS"), requiring a shorter writing time than in the four pulse method. In the pixel shift method, plural scanning lines are simultaneously supplied with different scanning signals for selection to provide an electric field intensity distribution spanning the plural scanning lines, thereby effecting a gradational display. According to this method, a variation in threshold due to a temperature variation can be absorbed by shifting a writing region over plural scanning lines. A similar concept is also disclosed in JP-A 63-29733.

An outline of the pixel shift method will now be described below.

A liquid crystal cell (panel) suitably used may be one having a threshold distribution within one pixel. Such a liquid crystal cell may for example have a sectional structure as shown in FIG. 6. The cell shown in FIG. 6 has an FLC layer 55 disposed between a pair of glass substrates 53 and 57 including one (53) having thereon transparent stripe electrodes 56 constituting data lines and an alignment film 54 and the other substrate 57 having thereon a ripple-shaped film 52 of, e.g., an insulating resin, providing a saw-teeth shape cross section, transparent stripe electrodes 51 constituting scanning lines and an alignment film 54. In the liquid crystal cell, the FLC layer 55 between the electrodes has a gradient in thickness within one pixel so that the switching threshold of FLC is also caused to have a distribution. When such a pixel is supplied with an increasing voltage, the pixel is gradually switched from a smaller thickness portion to a larger thickness portion.

The switching behavior is illustrated with reference to FIG. 7A. Referring to FIG. 7A, a panel under consideration is assumed to have portions having temperatures $T_1$, $T_2$ and $T_3$. The switching threshold voltage of FLC is lowered at a higher temperature. FIG. 7A shows three curves each representing a relationship between applied voltage and resultant transmittance at temperature $T_1$, $T_2$ or $T_3$.

Incidentally, the threshold change can be caused by a factor other than a temperature change, such as a layer thickness fluctuation, but an embodiment of the present invention will be described while referring to a threshold change caused by a temperature change, for convenience of explanation.

As is understood from FIG. 7A, when a pixel at a temperature $T_1$ is supplied with a voltage Vi, a transmittance of X % results at the pixel. If, however, the temperature of the pixel is increased to $T_2$ or $T_3$, a pixel supplied with the same voltage Vi is caused to exhibit a transmittance of 100%, thus failing to perform a normal gradational display. FIG. 7C shows inversion states of pixels after writing. Under such conditions, written gradation data is lost due to a temperature change, so that the panel is applicable to only limited use as a display device.

In contrast thereto, it becomes possible to effect a gradational display which is stable against such temperature change by displaying data for one pixel on two scanning lines S1 and S2 as shown in FIG. 7D.

The drive scheme will be described in further detail hereinbelow.

(1) A ferroelectric liquid crystal cell as shown in FIG. 6 having a continuous threshold distribution within each pixel is provided. It is also possible to use a cell structure providing a potential gradient within each pixel as proposed by our research and development group in U.S. Pat. No. 4,815,823 or a cell structure having a capacitance gradient. With any of these methods by providing a continuous threshold distribution within each cell, it is possible to form a domain corresponding to a bright state and a domain corresponding to a dark state in mixture within one pixel, so that a gradational display becomes possible by controlling the areal ratio between the domains.

The method is applicable to a stepwise transmittance modulation (e.g., at 16 levels) but a continuous transmittance modulation is required for an analog gradational display.

(2) Two scanning lines are selected simultaneously. The operation is described with reference to FIG. 8. FIG. 8A shows an overall transmittance—applied voltage characteristic for combined pixels on two scanning lines. In FIG. 8A, a transmittance of 0–100% is allotted to be displayed by a pixel B on a scanning line 2 and a transmittance of 100–200% is allotted to be displayed by a pixel A on a scanning line 1. More specifically, as one pixel is constituted by one scanning line, a transmittance of 200% is displayed when both the pixels A and B are wholly in a transparent state by scanning two scanning lines simultaneously. Herein, two scanning lines are selected for displaying one gradation data but a region having an area of one pixel is allotted to displaying one gradation data. This is explained with reference to FIG. 8B.

At temperature $T_1$, inputted gradation data is written in a region corresponding to 0% at an applied voltage $V_O$ and in a region corresponding to 100% at $V_{100}$. As shown in FIG. 8B, at temperature $T_1$, the range (pixel region) is wholly on the scanning line 2 (as denoted by a hatched region in FIG. 8B). When the temperature is raised from $T_1$ to $T_2$, however, the threshold voltage of the liquid crystal is lowered correspondingly, the same amplitude of voltage causes an inversion in a larger region in the pixel than at temperature $T_1$.

For correcting the deviation, a pixel region at temperature $T_2$ is set to span on scanning lines 1 and 2 (a hatched portion at $T_2$ in FIG. 8B).

Then, when the temperature is further raised to temperature $T_3$, a pixel region corresponding to an applied voltage in the range of $V_O$–$V_{100}$ is set to be on only the scanning line 1 (a hatched portion at $T_3$in FIG. 8B).

By shifting the pixel region for a gradational display on two scanning lines depending on the temperature, it becomes possible to retain a normal gradation display in the temperature region of $T_1$–$T_3$.

(3) Different scanning signals are applied to the two scanning lines selected simultaneously. As described at (2) above, in order to compensate for the change in threshold of liquid crystal inversion due to a temperature range by selecting two scanning lines simultaneously, it is necessary to apply different scanning signals to the two selected scanning lines. This point is explained with reference to FIG. 7.

Scanning signals applied to scanning lines 1 and 2 are set so that the threshold of a pixel B on the scanning line 2 and the threshold of a pixel A on the scanning line 1 varies continuously. Referring to FIG. 7B, a transmittance-voltage curve at temperature $T_1$ indicates that a transmittance up to 100% is displayed in a region on the scanning line 2 and a transmittance thereabove and up to 200% is displayed in a region on the scanning line 1. It is necessary to set the transmittance curve so that it is continuous and has an equal slope spanning from the pixel B to the pixel A.

As a result, even if the pixel A on the scanning line 1 and the pixel B on the scanning line 2 are set to have identical cell shapes as shown in FIG. 9B, it becomes possible to effect a display substantially similar to that in the case where the pixel A and the pixel B are provided with a continuous threshold characteristic (cell at the right side of FIG. 7B).

In the above-described known pixel shift method, pixels on an N-th scanning line and pixels on a preceding and adjacent (N-1)-th scanning line are written by simultaneously receiving different selection signals, so that data on the N-th scanning line is shifted to the (N-1)-th scanning line corresponding to a threshold change in associated pixels due to a temperature change, etc., thereby correcting the threshold change due to a temperature change, etc.

In such a driving scheme, however, the scanning lines have to be selected consecutively and line-sequentially, so that the scheme is not compatible with an interlaced scanning scheme wherein physically adjacent scanning lines are selected non-continuously.

On the other hand, in an FLC device, one picture-writing time (one frame scanning period) amounts to 102.8 msec if it is assumed that one line-scanning time is 100 μsec and one picture is constituted by 1028 scanning lines. This corresponds to a drive frequency of 9.73 Hz, i.e., 9.73 times of picture writing in one second.

If a brightness irregularity on a display picture is caused as a regular movement, the state is noticeable as flickering on the picture to human eyes. In order to remove the flickering, it is required to raise the drive frequency to about 40 Hz or adopt an interlaced scanning (thinning out or jump scanning) scheme.

In order to raise the drive frequency to 40 Hz, it is necessary to set the one line-scanning period to 24 μsec in the above-mentioned case of driving 1028 scanning lines. This is difficult to be accomplished (A) in view of the presence of a delay in transmission of an applied voltage waveform along a liquid crystal panel and (B) if the gradation signal is constituted by pulse width modulation. Thus, this is difficult to be applied to a display panel of a large area and a high resolution.

In order to prevent the flicker by providing an apparently increased drive frequency, a method of applying a so-called dummy scanning signal has been proposed by our research and development group as disclosed in JP-A 4-105285 (corr. to U.S. patent appln. Ser. No. 041,420, filed on Mar. 31, 1993). However, this method is accompanied with a difficulty that a decrease in contrast is inevitably caused.

Several interlaced scanning schemes are present in order to prevent the flicker. Among these, it is most desirable to use a scheme wherein the interlacing is performed at a weak regularity. For example, a first scanning line is first selected and subsequent scanning is performed with skipping of 8 lines in a first vertical scanning; a fifth scanning line instead of a second scanning line is first selected and subsequent scanning is performed with skipping of 8 lines in a second vertical scanning; a second scanning line is first selected and subsequent scanning is performed with skipping of 8 lines; and so on. That is a so-called random interlaced scanning scheme, which however is not compatible with the above-mentioned pixel shift method essentially requiring consecutive line-sequential scanning.

The above is an explanation of a problem to be solved according to one aspect of the present invention.

A liquid crystal apparatus is also accompanied with another problem as described below.

The liquid crystal layer in an FLC device has a very small thickness on the order of 1–3 μm so as to assume a non-helical structure and, accordingly, a spacing between a pair of opposing electrodes for applying a voltage to the liquid crystal layer so that it is necessary to provide an insulating layer for preventing short circuitry between the opposing electrodes and also an alignment layer for aligning ferroelectric liquid crystal molecules in a certain direction.

These layers are ordinarily composed of an electrically insulating material. On the other hand, in the case of an FLC, the liquid crystal layer per se has a spontaneous polarization, so that an internal electric field is developed within the liquid crystal layer and positive and negative charges are generated so as to sandwich the liquid crystal layer and cancel the internal electric field. The generation of an electric field counter-acting the internal electric field caused by the spontaneous polarization is performed in most cases by movement of an ionic substance within the liquid crystal layer, the alignment film and the insulating film. Such an ionic substance generally has a certain mobility and requires a certain period for its movement in a certain distance through a medium such as the liquid crystal layer under a certain electric field.

FLC molecules may be oriented in an UP state (the spontaneous polarization being directed from an upper substrate to a lower substrate) and a DOWN STATE (the spontaneous polarization being directed from the lower substrate to the upper substrate). In case where liquid crystal molecules in a pixel uniformly oriented in the UP state are switched into the DOWN state by application of an electric field therefor, the counter electric field (or charges) present so as to sandwich the liquid crystal layer for canceling the internal electric field in the UP state is not simultaneously removed but remains for a certain period. The magnitude of the counter electric field may be different depending on the magnitude of the spontaneous polarization and the capacity of the insulating layers (including the alignment layer).

The remaining electric field is caused to disappear with time, and then an internal electric field due to the spontaneous polarization in the DOWN state and a counter electric field for canceling the internal electric field are formed. However, in the period until the disappearance of the counter electric field, the liquid crystal molecules are in a very unstable state that, while they are in the DOWN state, they are liable to be returned to the UP state due to the remaining counter electric field. Particularly, liquid crystal molecules inverted into the DOWN state close to a domain wall, i.e., a boundary between the DOWN state and the UP state, are in a state that they are liable to be returned to the UP state. Accordingly, if a voltage of the same polarity as an inversion voltage for switching to the UP state is applied to the liquid crystal molecules before the disappearance of the remaining electric field, the liquid crystal molecules can be returned to the UP state if the voltage is below the prescribed inversion voltage.

The inversion of FLC due to application of a voltage is generally governed by a relationship of (pulse width)×(voltage)$^A$=constant (wherein A is an experimentally determined value in the range of $1<A<3$). Accordingly, even if the voltage is very low (1–2 volts), a re-inversion from DOWN to UP can occur when the voltage is applied to the liquid crystal layer for a long period.

The presence of the counter electric field may be particularly problematic in case of gradational (halftone) display wherein a pixel is provided with an inversion threshold distribution and a plurality of domain walls are present in a pixel. For example, it may be problematic in case of writing in a pixel already having domain walls (i.e., a pixel after first writing) in a drive system, such as the above-mentioned pixel shift method, wherein a threshold change due to, e.g., a temperature change, is corrected by application of plural pulses.

In such a drive method, a temperature change is compensated for according to the principle that a pixel subjected to overwriting in the first writing is subjected to return-writing in the second writing. This process inherently requires the co-presence of plural domain walls in a pixel.

In effecting temperature compensation, it is necessary to effect a second writing without being affected by a first written state. This is explained with reference to FIG. 10. FIGS. 10(*a*) and 10(*b*) show states satisfying the condition. Pixels at (a) and (b) after the clearing are written with different data in a first writing and then subjected to a second writing. In this case, if the pixels at (a) and (b) are subjected to an identical temperature change, identical areas of black domain must be written in the second writing. In FIG. 10, the condition of A=B is satisfied. On the other hand, in view of pixels at (c) and (d), the pixel at (c) as a result of the second writing is subjected to writing of black domain C and also movement of the domain wall formed in the first writing to C'. Similarly, a pixel at (d) as a result of the second writing is subjected to not only the formation of D but also to movement of the domain wall formed in the first writing to D' and connections between D and D'. These phenomena at the pixels (c) and (d) are caused by application of an inversion voltage while liquid crystal molecules in the vicinity of the domain wall are in an unstable of being susceptible of re-inversion, so that even unstable liquid crystal molecules not expected to be re-inverted are re-inverted.

If such movement of domain walls to C' and D' and connection of domains occur, a required additivity of the first and second writings (i.e., the requirement of the second writing not being affected by the first written state) is not satisfied, so that an accurate temperature compensation is not effected. Such movement of or connection between domain walls are also dependent on the amount of the first writing (i.e., the electric field intensity at the time of the first writing) and it is generally difficult to satisfy the required additivity when the domain walls are required to be set with a small spacing therebetween.

For example, in case where a cell having a structure as shown in FIG. 6 was prepared by forming 330 Å-thick alignment films 54 from a polyimide precursor liquid ("LQ-1802" available from Hitachi Kasei K.K.), a layer 55 of a liquid crystal material the same as the one used in an Example appearing hereinafter and 2000 Å-thick insulating layers (not shown) of $Ta_2O_5$ below the alignment films 54, an exact additivity could not be satisfied when the domain wall spacing was reduced to 20–30 μm or less.

As described above, in an FLC device, a certain period is required because of a counter electric field corresponding to the internal electric field until inverted liquid crystal molecules are stabilized. Accordingly, in case of effecting a display through application of plural pulses, it has been necessary to place a certain period between writings to use a longer period of writing in a pixel or to effect a certain degree of excessive writing. Particularly in case of gradational display through formation of plural domain walls, a connection is liable to be formed between the domain walls, so that a higher degree of temperature compensation has been prevented. This is a problem to be solved by a second aspect of the present invention.

SUMMARY OF THE INVENTION

An object of the present invention is to provide a driving method for a ferroelectric liquid crystal device capable of effecting a gradational display with more accurate compensation for a threshold change as caused by a temperature change, and also an liquid crystal apparatus allowing such a gradational display.

According to a first aspect of the present invention, there is provided a driving method for a liquid crystal device of the type comprising a pair of oppositely disposed electrode plates having thereon a group of scanning lines and a group of data lines, respectively, and a ferroelectric liquid crystal disposed between the pair of electrode plates so as to form a pixel at each intersection of the scanning lines and data lines; said driving method comprising:

applying a prescribed scanning signal to a selected scanning line and applying prescribed data signals to the data lines in synchronism with the scanning signal, so that (a) a first voltage signal is applied to a pixel on a selected scanning line, the first voltage signal including a clear pulse, a writing pulse of a polarity opposite to that of the clear pulse and a correction pulse of a polarity opposite to that of the writing pulse, (b) a second voltage signal is applied to an associated pixel on a subsequently selected scanning line, the second voltage signal including a clear pulse, a writing pulse and a correction pulse of which polarities are respectively opposite to corresponding pulses of the first voltage signal, and (c) the correction pulse applied to the pixel on the selected scanning line is determined based on gradation data for the associated pixel on the subsequently selected scanning line, and the writing pulse applied to the pixel on the selected scanning line is determined based on gradation data for the pixel on the selected scanning line and the above-determined correction pulse.

According to a second aspect of the present invention, there is provided a liquid crystal apparatus, comprising a liquid crystal device of the type comprising a pair of oppositely disposed electrode plates having thereon a group of scanning electrodes and a group of data electrodes, respectively, and a ferroelectric liquid crystal layer disposed between the pair of electrode plates so as to form a pixel at each intersection of the scanning electrodes and data electrodes: and drive means including scanning signal application means and data signal application means for writing plural times in each pixel to form a domain wall separating regions of different optical states in the pixel to effect a desired gradational display, wherein a film layer having a volume resistivity of at most $10^8$ ohm.cm is disposed between the ferroelectric liquid crystal layer and at least one of the scanning electrodes and the data electrodes.

The film having a volume resistivity of at most $10^8$ ohm.cm may preferably comprise at least two layers including an organic layer disposed on the liquid crystal side for alignment control of the liquid crystal and an inorganic layer disposed on the electrode side.

The lower resistivity film between the electrode and the liquid crystal layer is effective in accelerating the moment of charges occurring in response to the spontaneous polarization to the electrode side, so that domain walls formed in a pixel are stabilized between successive writings among a plurality of writings in a pixel to increase the additivity in temperature-compensating drive scheme, thereby providing an improved stability of display level during gradational display.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 5(*a*)–(*d*) constitute a time chart for describing the four-pulse method.

FIG. 6 is a schematic sectional view of a liquid crystal cell applicable to the invention.

FIGS. 8A, 8B, 9A and 9B are other views for illustrating a pixel shift method.

FIGS. 25(*a*)–(*e*) constitute a waveform diagram showing a set of drive signals used in an embodiment of the present invention.

DESCRIPTION OF THE PREFERRED EMBODIMENTS

Figure 1A:
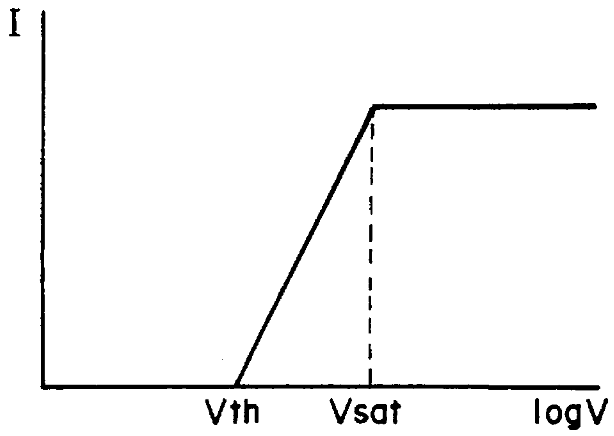
FIG. 1A PRIOR ART
FIGS. 1A and 1B are graphs illustrating a relationship between switching pulse voltage and a transmitted light quantity contemplated in a conventional areal modulation method.
Figure 1B:
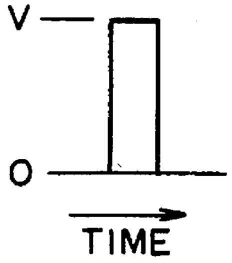
FIG. 1B PRIOR ART
Figure 2A:
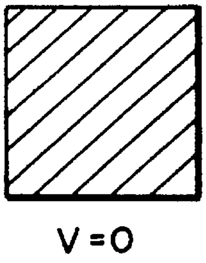
FIG. 2A PRIOR ART
FIGS. 2A–2D illustrate pixels showing various transmittance levels depending on applied pulse voltages.
Figure 2B:
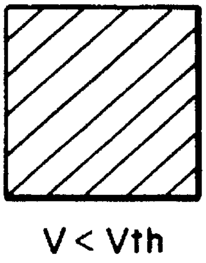
FIG. 2B PRIOR ART
Figure 2C:
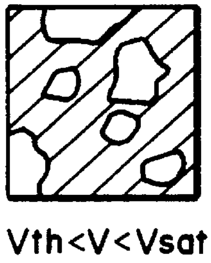
FIG. 2C PRIOR ART
Figure 2D:
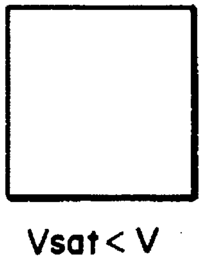
FIG. 2D PRIOR ART
Figure 3:
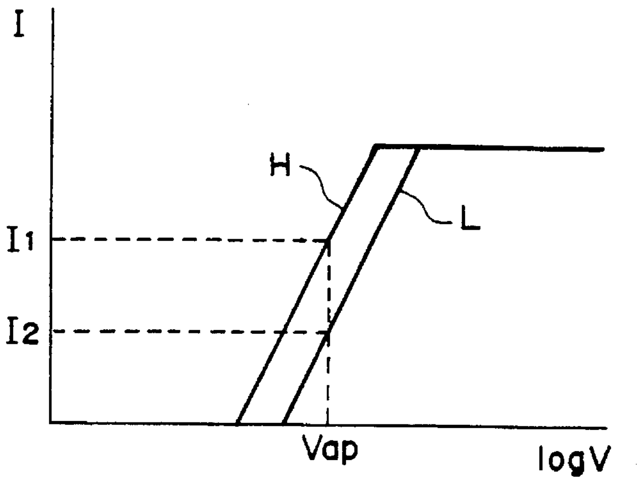
FIG. 3 PRIOR ART
FIG. 3 is a graph for describing a deviation in threshold characteristic due to a temperature distribution.

FIG. 11 shows a set of drive signal waveforms according to an embodiment of the present invention.

At $S_1$–$S_4$ are shown scanning selection signals applied to mutually adjacent first to fourth scanning lines $S_1$–$S_4$ and at I is shown a succession of data signals applied to a data line I in synchronism with the scanning selection signals to determine the display states of pixels on the data line I. For example, a voltage at I-$S_1$ is applied to a pixel I-$S_2$ at the intersection of the scanning line $S_2$ and the data line I.

A scanning selection signal includes a clear pulse (A), a first selection pulse (B) and a second selection pulse (C). The clear pulse (A) is a pulse for resetting the pixels on a scanning line to either one of bright and dark states regardless of the content of data signals synchronized therewith and has a pulse width $t_1$ and a peak height $Vs_O$.

The first selection pulse (writing pulse) (B) is a pulse for inverting a 0–100% region of a reset pixel in cooperation with a data pulse ($Vi_1$) applied to a data line in synchronism therewith and has a pulse width $t_2$ and a peak height $Vs_1$.

The second selection pulse (C) is a pulse for causing at a pixel on a scanning line concerned ($S_1$) a display state corresponding to a data pulse ($Vi_2$) determined based on a display state expected to be displayed at a pixel on a subsequent scanning line ($S_2$). It is to be noted that the pulse (C) is different from a known auxiliary signal for canceling the DC component on the scanning line. Such a known auxiliary signal is set to have a pulse width and a peak height determined so as not to change an already formed display state of pixels concerned.

In contrast thereto, the second selection pulse (C) in the present invention is set to have a pulse width which are determined to change a display state of a pixel on a scanning line concerned depending on a display data for a pixel on a next adjacent scanning line so as to compensate for a possible threshold change at the pixel on the scanning line concerned due to a temperature change, etc.

The second selection pulse (C) is applied in succession to the first selection pulse (B) in contrast with a pulse (C) shown in FIG. 5 which is applied after lapse of a certain period after a pulse (B), in which period a pulse (B) for another scanning line is also applied. In other words, a succession of the clear pulse (A) and selection pulses (B) and (C) are applied to an n-th scanning line and thereafter an identical succession of the pulses (A), (B) and (C) is applied to a subsequent (n+1)-th scanning line.

Accordingly, after the writing into pixels on an n-th scanning line is completed inclusive of a compensation for a threshold change, a subsequent scanning line is selected, so that the subsequent scanning line need not be a physically adjacent (n+1)-th scanning line but can be an arbitrary scanning line, such as an (n+10)th scanning line or an (n+100)th scanning line.

The scanning selection signal including the pulses (A), (B) and (C) in FIG. 11 may preferably be adopted in an interlaced scanning scheme so as to suppress a flicker on a panel which may be driven at a low frequency according to the pixel shift method.

Alternatively, the scanning selection signal may also be adopted in a partial rewrite scheme wherein a part of scanning lines, e.g., m-th to (m+1)th scanning lines, among all the scanning lines are selected (repetitively) to partially rewrite a part of the displayed picture, so as to effect a multi-window display at a high display quality free from flicker.

In the above-mentioned pixel shift method, before a pulse (C) for a pixel on an n-th scanning line is applied, pulses (A) and (B) for a subsequently selected scanning line are applied, so that a disturbance of a displayed picture is caused, if skipping of scanning lines is performed as in an interlaced scanning scheme or a random access as in a partial rewrite.

The driving method according to the present invention may be called a "random pixel shift method" if the possibility of random access of scanning lines in the pixel shift method is noted.

Now, the driving method using the signal waveforms shown in FIG. 11 will be described in further detail. When a succession of pulses shown in FIG. 12A (similar to a scanning selection signal shown at $S_2$ in FIG. 11) is applied to a liquid crystal layer at a pixel in an FLC device, the orientation of the liquid crystal is reset to one state (referred to as "DOWN") by application of a voltage pulse $V_O$ (reset state). Then, the liquid crystal can be re-inverted from DOWN state to the other orientation state (referred to as "UP") by application of a voltage pulse $V_1$. At this time, if a pixel is provided with a threshold distribution, e.g., by a cell thickness distribution, it is possible to effect a gradational display.

Now, it is assumed that a pixel having no threshold distribution is reset by application of pulse $V_O$, then written in UP by application of pulse $V_1$ and further written in DOWN by application of pulse $V_2$. At this time, the magnitude of the voltage pulse $V_2$ required for uniformly orienting the pixel to DOWN largely depends on the magnitude of the voltage pulse $V_1$.

Figure 12A:
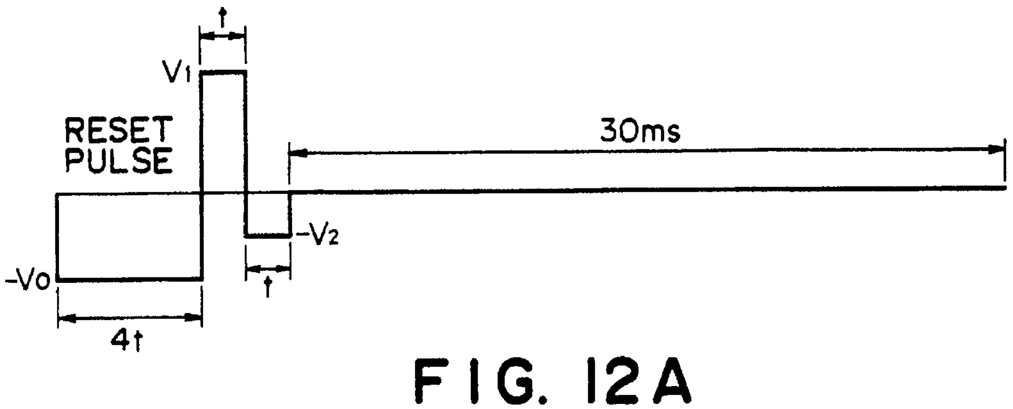
FIG. 12A PRIOR ART
FIGS. 12A and 12B show waveforms for illustrating a function of the present invention.
Figure 12B:
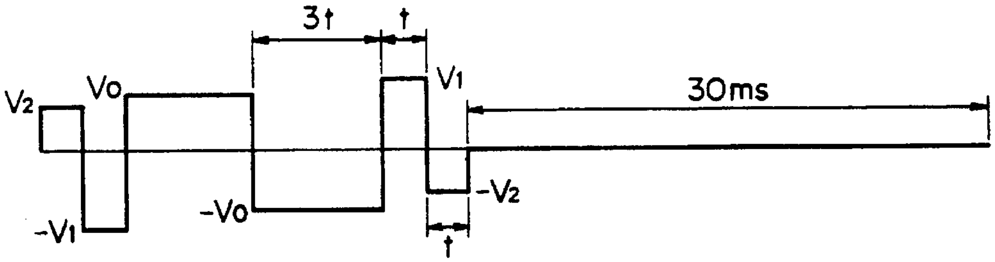
FIG. 12B PRIOR ART
Figure 13:
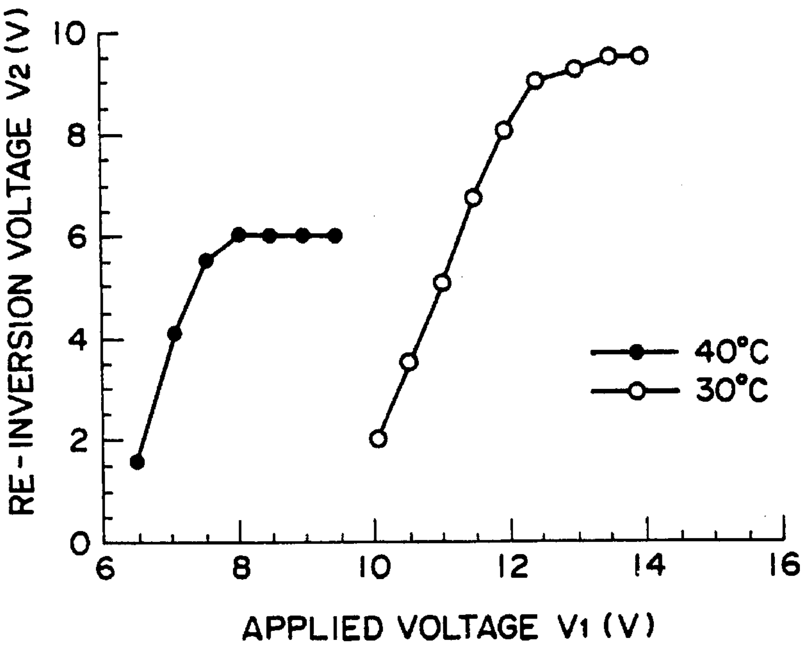
FIG. 13 is a graph for illustrating an inversion threshold change.

In a specific case wherein a liquid crystal device cell identical to the one used in Example 1 described hereinafter was prepared and subjected to refresh-writing by application of signals as shown in FIG. 12B (free from DC component as an average voltage within one cycle) at a cycle of about 30 Hz (t=40 μsec). FIG. 13 summarizes a relationship of re-inversion voltage pulses $V_2$ required for re-inversion after application of $V_1$ pulses with varying magnitude.

In FIG. 13, the voltage $V_1$ of the writing pulse is taken on the abscissa, and the ordinate represents the peak height of the pulse $V_2$ required for re-inversion when applied subsequent to the pulse $V_1$ having a peak height indicated on the abscissa. The results obtained at 30° C. and 40° C. are respectively shown in FIG. 13.

When the drive waveform shown in FIG. 12B is applied, the liquid crystal is reset to DOWN state by application of the $V_O$ pulse and then re-written to UP state by application of the $V_1$ pulse. According to the data at 30 ° C. in FIG. 13, if the $V_1$ pulse had a voltage value of 10.08 volts (pulse width=40 μsec), the orientation state could be re-inverted to DOWN state by application of a $V_2$ pulse having a voltage value of 2.0 volts. However, if the $V_1$ pulse had a voltage of 11 volts, the $V_2$ pulse required a voltage value of 5 volts.

In this way, the voltage value required for re-inversion by application of the $V_2$ pulse varied depending on the $V_1$ pulse and was saturated above a certain $V_1$ pulse as shown in FIG. 13. In either case of $V_1$=10.08 volts or 12 volts, the pixel was entirely written in UP when the $V_2$ pulse was 0 volt. Accordingly, it is also understood that, even if two pulses equally forming UP state are applied and then a re-inversion pulse for writing DOWN is applied, the magnitude of the re-inversion pulse required for the reinversion varies depending on the magnitude of the preceding pulse for forming UP state. The UP states formed by application of two $V_1$ pulses having different magnitudes appear to be optically identical to each other but can have different molecular alignment states. In other words, it may be said that the threshold for re-inversion by the $V_2$ pulse varies depending on the state of liquid crystal molecules subjected to application of the $V_2$ pulse.

The phenomenon that the re-inversion threshold voltage by application of the $V_2$ pulse varies depending on the magnitude of the preceding $V_1$ pulse and is saturated above a certain $V_1$ voltage, is equally observed at different temperatures (FIG. 13).

Further examination of the relationship between the $V_1$ pulse and the $V_2$ pulse has also shown the following fact.

Figure 14:
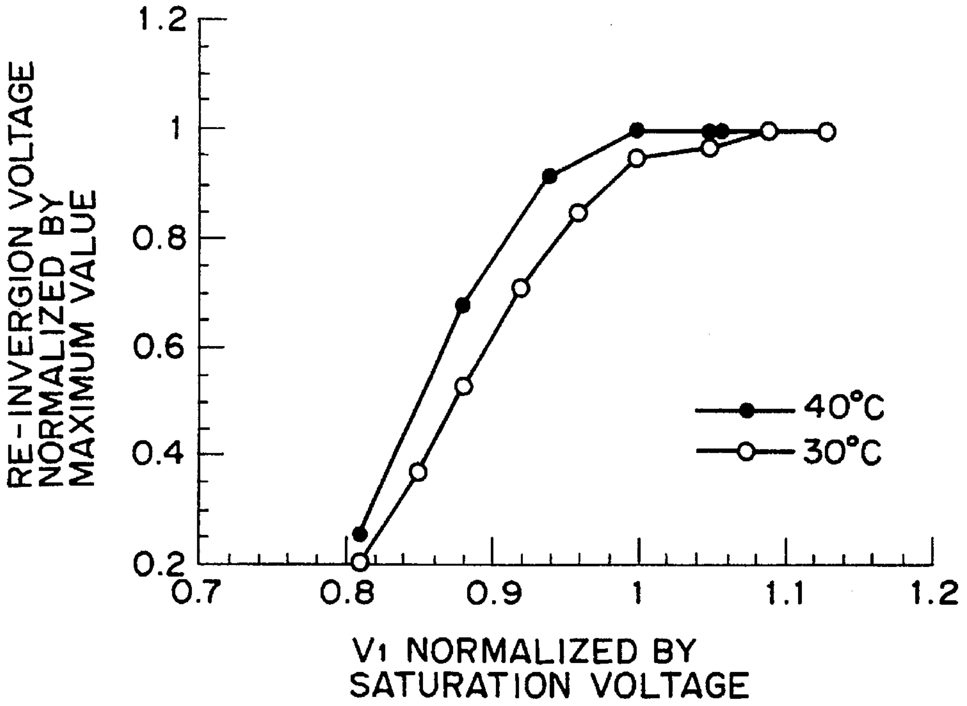
FIG. 14 is a graph having normalized scales for illustrating a threshold change corresponding to that shown in FIG. 13.

If voltages $V_1$ and $V_2$ are normalized so as to provide "1" at the saturation of the re-inversion voltage $V_2$, a relationship shown in FIG. 14 is obtained. FIG. 14 shows that the above-mentioned characteristic shows little dependence on temperature. That is, with reference to the $V_1$ and $V_2$ values at the saturation of the re-inversion voltage $V_2$ versus $V_1$, if $V_1$ causes a certain proportion of change, $V_2$ also causes a corresponding proportional change. More specifically, if $V_1$ reduces to 0.8 with respect to a reference value (i.e., $V_1$ at the saturation of $V_2$), $V_2$ uniformly reduces to about 0.2 with respect to a reference value (i.e., $V_2$ at the saturation of $V_2$ or maximum $V_2$) regardless of the temperature being at 30° C. or 40° C.

From the characteristics shown in FIGS. 13 and 14, in the case where a driving voltage waveform as shown in FIG. 12A or FIG. 12B is applied to a liquid crystal layer in an FLC device having a threshold distribution in a pixel, it is possible to estimate the quantity of re-inversion by application of a $V_2$ pulse after writing by application of $V_1$ pulse. According to FIG. 14 showing results obtained by a device having a cell thickness gradient in a pixel, it is understood that, when a pixel is written to a cell thickness $d_1$ and then supplied with pulses of $V_1$=1 (normalized value) and $V_2$=0.6, the domain walls can be reinverted in the range of 1–0.85 up to a cell thickness position of $d_1/d_2$=0.85.

Figure 15:
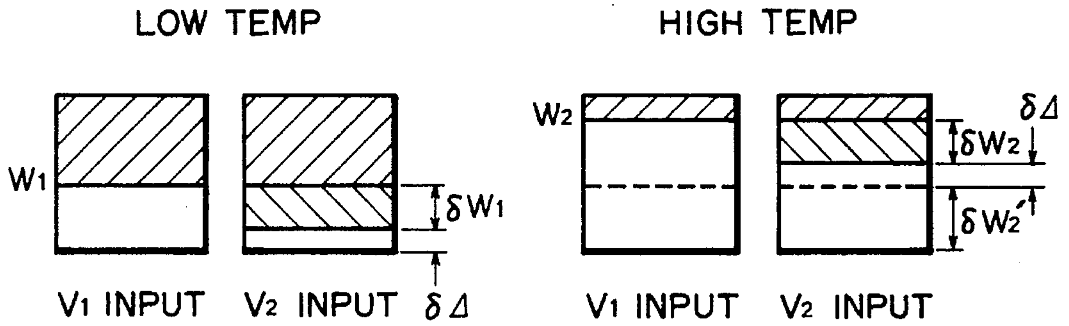
FIGS. 15–17(*b*) are schematic illustrations for describing gradation data shift by successive pulses according to the present invention.

The phenomenon is further described with reference to FIG. 15. At a low temperature $T_1$, a pixel is written in $W_1$% by application of a $V_1$ pulse and returned by $\delta W_1$% by application of a $V_2$ pulse. At a high temperature $T_2$, a pixel is written in $W_2$% ($W_2$>$W_1$) by application of the $V_1$ pulse and returned by $\delta W_2$% by application of the $V_2$ pulse. At this time, $\delta W_1=\delta W_2$. This means that the change in written amount ($\delta W_1$ and $\delta W_2$) by a succession of the $V_1$ and $V_2$ pulses is constant regardless of the temperature. Accordingly, a data quantity $\delta\Delta$ obtained by removing a writing change $\delta W_2$, caused by a temperature change does not depend on the temperature. Accordingly, if a writing quantity change ($\delta W_2$' in the above) can be corrected separately, a gradation data can be written by a succession of pulses $V_1$ and $V_2$.

Figure 16A:
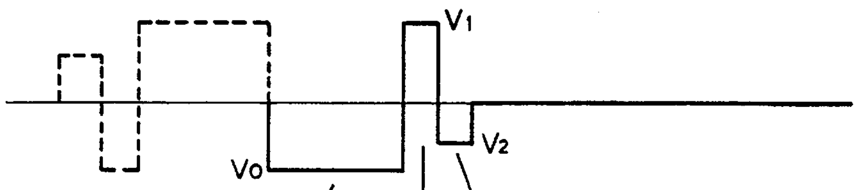
Figure 16B:
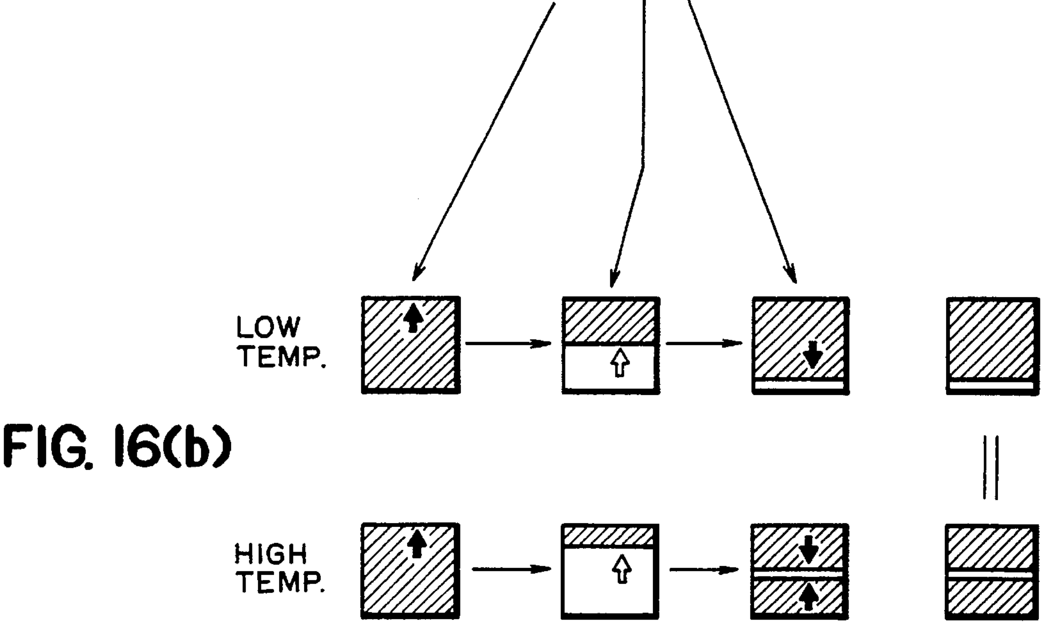
Figure 16C:
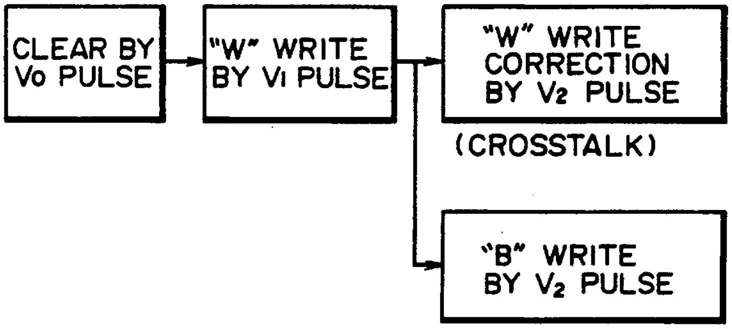

FIG. 16 illustrates functions of the $V_1$ and $V_2$ pulses. Referring to FIG. 16, both a high temperature pixel and a low temperature pixel are reset to a wholly black state by application of a $V_O$ pulse and then written into "white" by application of a $V_1$ pulse. The white-writing quantity by the $V_1$ pulse differs at a high temperature and a low temperature, and the difference is corrected by a $V_2$ pulses. More specifically, by application of the $V_2$ pulse subsequent to the $V_1$ pulse, (a) the written state formed by the $V_1$ pulse is corrected, and (b) the temperature-dependent different or deviation is corrected. The voltage value for the $V_2$ pulse is determined first for (b) the temperature-dependent deviation, and then the $V_1$ voltage is determined so as to obtain a desired written quantity when followed by the $V_2$ voltage pulse.

According to FIG. 14, it is possible to know a re-inversion quantity by application of the determined $V_2$ voltage pulse depending on the magnitude of the $V_1$ voltage pulse, so that a desired gradation can be written by determining the $V_1$ voltage while taking the re-inversion quantity into consideration.

The above driving principle is applicable not only to a device having a cell thickness gradient (electric field intensity distribution) in a pixel a shown in FIG. 6 but generally to a device having an inversion threshold distribution in a pixel.

In the above, it has been described possible to display a certain data by removing a succession of $V_1$ and $V_2$ pulses while removing the temperature-dependent deviation. Now, a temperature-compensation function of a $V_2$ pulse will be described with reference to FIG. 17.

Figures 17A, 17B:
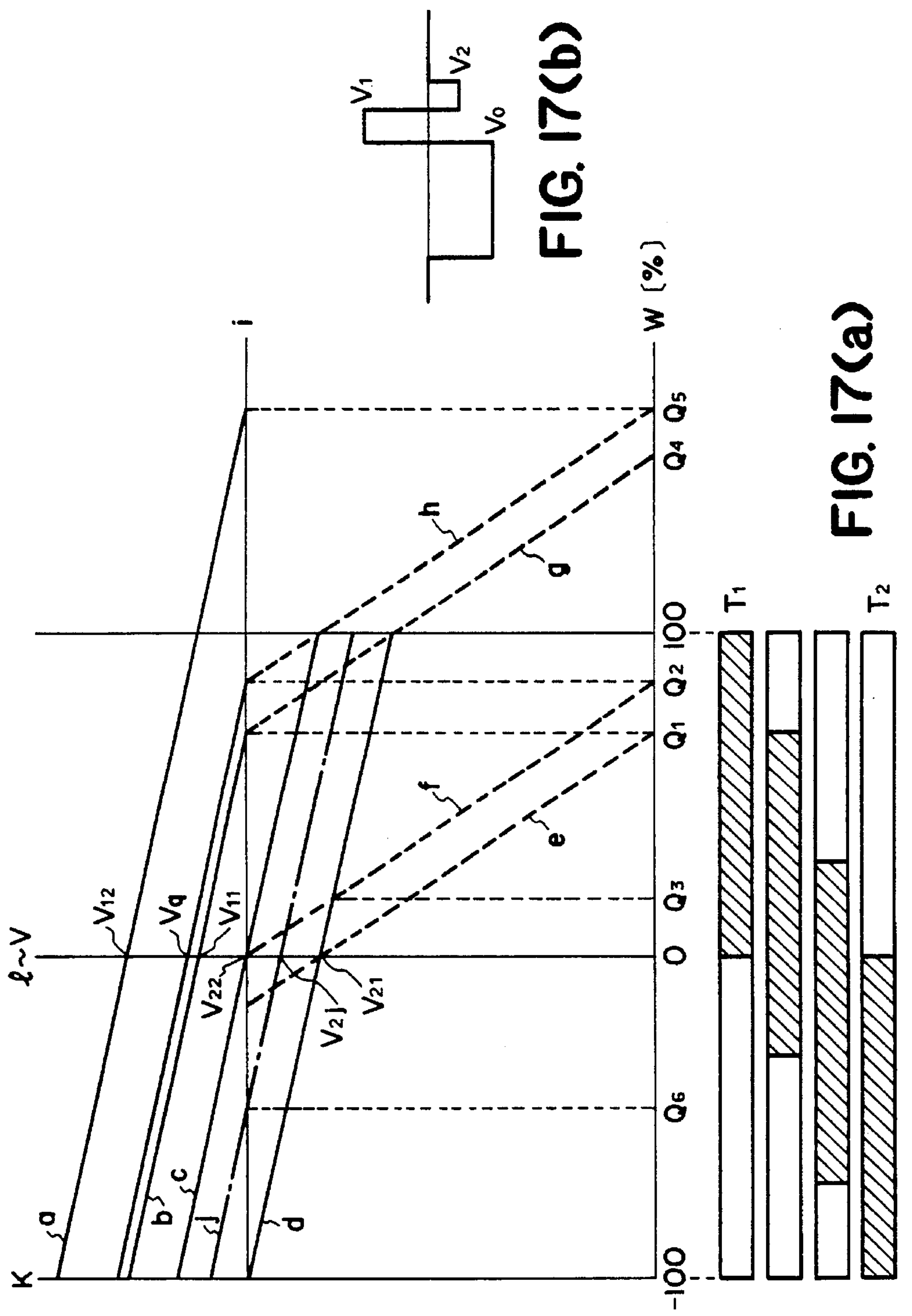

In FIG. 17, the abscissa represents a transmittance W (%). A device is assumed to have a monotonous threshold distribution in a pixel as shown in FIG. 6 so as to satisfy a linear relationship between the transmittance W and the logarithm of a voltage (ln V) at constant pulse width. It is actually possible to design such a cell thickness gradient.

In case of writing in a pixel on a scanning line (N) which is assumed to be subjected to a sequence of "black" reset and "whir" writing, a correction pulse $V_2$ is set in a direction of writing "black". Correspondingly, a subsequently selected (N+1)-th line may be subjected to a sequence of white reset, black writing and white correction. This is because the data on the (N+1)th line is shifted toward the N-th line corresponding to a temperature deviation, the data carried by $V_2$ is naturally in the black writing direction in order to enter the N-th line and the expected gradational display on the (N-th)-th line by $V_1$ is in the direction of writing black.

In the present invention, a temperature range $T_1$–$T_2$ allowing a temperature compensation is such a temperature range that the threshold change of FLC due to the temperature change amounts to 1/x wherein x denotes a threshold ratio in a pixel. This means a temperature range such that the lower limit of the threshold distribution at $T_1$ is equal to the upper limit of the threshold distribution at $T_2$. $V_2$ assumes a voltage range of $V_{21}$–$V_{22}$ allowing gradational display of 0–100% corresponding to the threshold at $T_2$ (before being affected by $V_1$).

In FIG. 17, a horizontal line ! represents a threshold of inversion after resetting at a low temperature $T_1$. Accordingly, if a voltage in excess of i is applied, FLC causes a state inversion thereof. Herein, the $V_1$ pulse and the $V_2$ pulse have symmetrical thresholds while their polarities are different and, in FIG. 17, the voltages are indicated with an identical sign.

Next, the setting of $V_2$ and $V_1$ based on expected gradation data will be described. In consideration of the inversion threshold change due to $V_1$ described with reference to FIGS. 13 and 14, $V_{11}$ is assumed to represent a value of $V_1$ by which the resultant state is returned to 0% display by application of $V_{21}$, and $V_{12}$ is assumed represent a value of $V_1$ capable of retaining 100% display even after application of $V_{22}$, so that $V_1$ can assume a voltage range of $V_{11}$–$V_{12}$. Solid lines a–d in FIG. 17 represent $V_{12}$, $V_{11}$, $V_{22}$ and $V_{21}$, respectively, and actually have slopes because of an electric field intensity gradient due to a threshold distribution in a pixel.

Referring to FIG. 17, when $V_{11}$ is applied, a pixel is caused to have a gradation of $Q_1$ (%) at which a domain wall (hereinafter called a "wave plane $Q_1$") is formed. By the application of $V_{11}$, the inversion threshold is changed from i to a dashed line e. The inversion threshold change ratio is constant as described before. With respect to the wave plane $Q_1$, any voltage of $V_{21}$–$V_{22}$ exceeds the above-mentioned e, so that the pixel is returned to 0% display by the application of $V_2$. Further, in case where Vq slightly higher than $V_{11}$ is applied as $V_1$, a pixel is caused to display a gradation of $Q_2$ (%) higher than $Q_1$ and the inversion threshold is changed to a dashed line f. With respect to the line f, $V_{22}$ is always not below the line so that the wave plane $Q_1$ is inverted to 0% display by application of $V_{22}$ but $V_{21}$ is partly below f, so that the inversion cannot be effected at the part. The part is denoted by $Q_3$ in FIG. 17. Accordingly, in case where a gradation of 0% is expected to be displayed, $V_{11}$ may be applied as $V_1$ even if $V_2$ determined based on gradation data is any of $V_{21}$–$V_{22}$. In case where a gradation of $Q_3$ is expected to be displayed, Vq may be applied as $V_1$ for $V_{21}$, and a voltage higher than Vq may be applied for $V_{22}$ since 0% display results if $V_1$ =Vq. For displaying a gradation of 100%, a value of $V_1$ providing $Q_4$ is applied for $V_2$=$V_{21}$ and a value of $V_1$ providing $Q_5$ is applied for $V_{22}$. More specifically. Incidentally, $V_1$ providing $Q_5$ is $V_{12}$. Incidentally, the gradation display upper limit is 100%, $Q_4$ and $Q_5$ actually mean 100% display but, as the inversion threshold change depending on $V_1$ is present, $Q_4$ and $Q_5$ are indicated in excess of 100% so as to cover such cases. Dashed lines g and h represent the respective threshold changes.

A temperature change in FIG. 17 is assumed to correspond to an increase in applied voltage $V_1$ and $V_2$ relative to the inversion threshold of the liquid crystal and is regarded as identical to parallel movement of 0% position and 100% position toward a K-axis. This corresponds to parallel movement of a [0, 100] region to a [−100, 0] region in FIG. 17.

In case of a temperature increase, writing by a $V_2$ pulse occurs in a 0% side. This is because $V_2$ for an N-th line is determined by gradation data for an (N+1)-th line. Thus, the threshold is lowered due to the temperature increase and, corresponding to the threshold change, the gradation data for the (N+1)-th line is written on the N-th line. On the N-th line, $V_2$ and $V_1$ are of mutually opposite polarities. The writing directions on the N-th and (N+1)-th lines are mutually opposite. Accordingly, the shift of gradation data for the (N+1)-th line by $V_2$ is effected in black-writing if the N-th line is subjected to white writing. Gradation data for the N-th line is shifted to an (N−1)-th line by $V_2$ corresponding to the shift of gradation data for the (N+1)-th line thereto. Accordingly, gradation data are displayed while being sequentially shifted to adjacent lines. For example, in case where the gradation data for the (N+1)-th line is 50%, a pixel is inverted to 50% black by black writing with $V_1$ at $T_1$ and, even if 50% of gradation data is shifted to the N-th line due to a temperature increase, the gradation data shifted to the N-th line is the remaining white (50%), so that no black writing by $V_2$ is caused on the N-th line. In the case of the same 50% shift, however, if the gradation data on the (N+1 )-th line is 80% black, the remaining 20% white and 30% black are shifted to the N-th line, so that 30% black writing is effected by $V_2$. If the gradation on the (N+1)-th line is 100% black, 50% black writing is effected by $V_2$ on the N-th line.

The above point will be further described with reference to FIG. 17, wherein an intersection of a dot-and-dash line j and a solid line i provided a projection $Q_6$ on the abscissa which is at an exactly mid point in the range [−100, 0], so that the line j exceeds the inversion threshold in the range [−100, $Q_6$) and is below the inversion threshold in the range [$Q_6$, 0]. Accordingly, in case of the $V_2$ pulse having a voltage of $V_2$j, writing on the 0% side does not occur unless the threshold change due to a temperature change requires a rewriting of 50% or higher.

A necessary condition for effecting a drive in combination with temperature compensation by applying a succession of $V_1$ and $V_2$ pulses according to the present invention is that the liquid crystal threshold distribution after writing with the $V_1$ pulse is steeper than the electric field intensity distribution applied to the pixel.

According to the above-described driving principle, as shown in strips at the lower part of FIG. 17, data (indicated as a hatched part) displayed on scanning lines are continuously changed from a low temperature ($T_1$) to a high temperature ($T_2$) so that data expected to be displayed on an (N+1)-th line at $T_1$ is displayed on an N-th line at $T_2$.

According to the driving method of the present invention, when an entire liquid crystal panel is at a temperature of, e.g., $T_1$, all the pixels effect expected gradational display of their own scanning lines and, when the entire liquid crystal panel is at a temperature $T_2$, all the pixels display gradation data on respectively subsequent scanning lines. Accordingly, in the latter case, the display is deviated by one line but the one-line deviation can be substantially ignored since an actual liquid crystal panel includes a large number of scanning lines. Further, in case where a temperature gradient from a side of $T_1$ to an opposite side of $T_1$ is developed along a panel, the expected display is performed on the $T_1$ side but the shift of gradation data is gradually increased toward the $T_2$ side. As described above, however, one-line shift can be substantially negligible and adjacent two scanning lines can be regarded as at the same temperature, so that substantially no problem is caused by such a temperature distribution.

Figure 18:
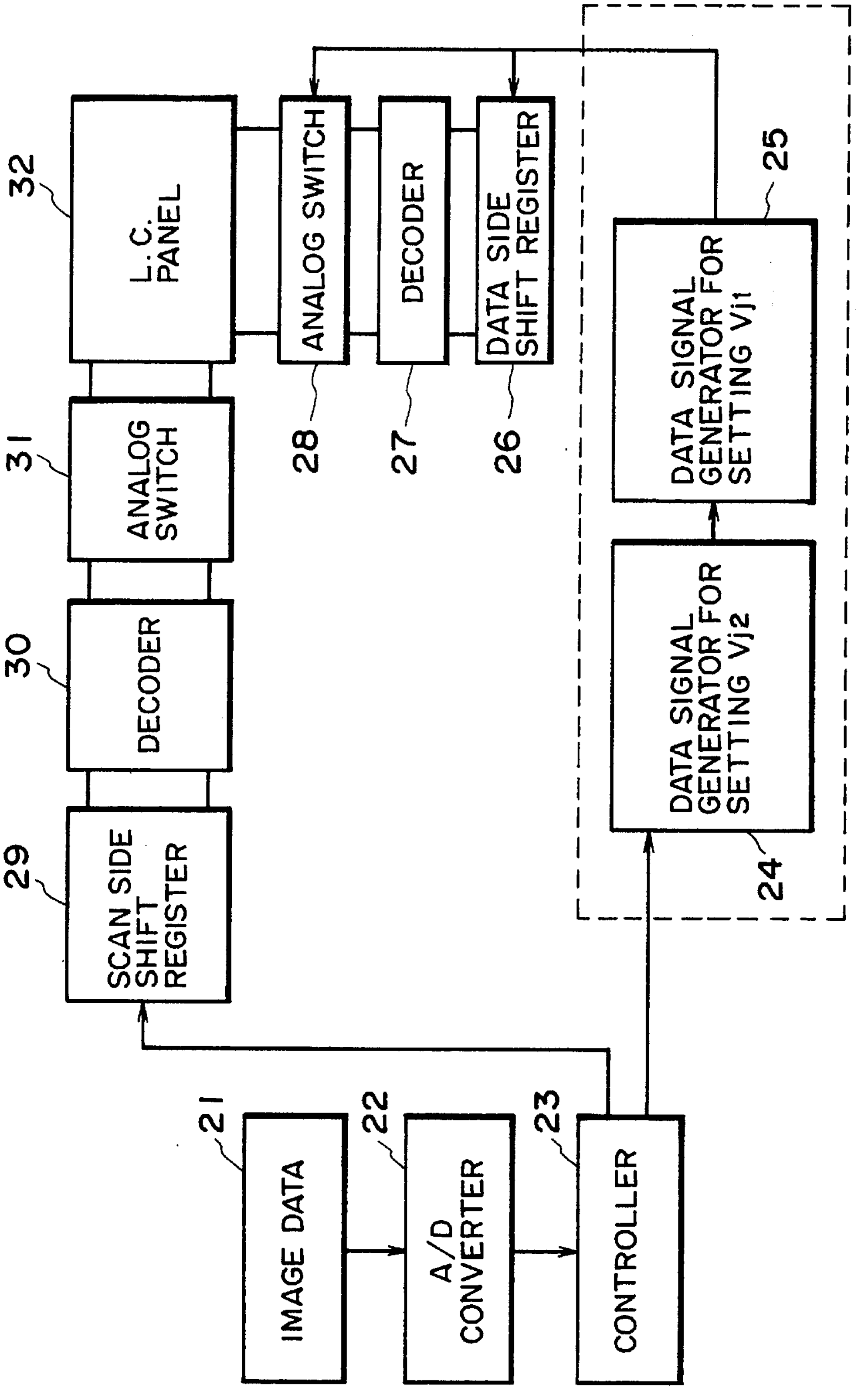
FIG. 18 is a block diagram of a liquid crystal display apparatus according to an embodiment of the present invention.

FIG. 18 is a block diagram of a liquid crystal apparatus including a drive circuit for supplying a drive signal waveform as shown in FIG. 11 to a liquid crystal panel 32. Referring to FIG. 18, the apparatus includes an image data source 21 for supplying a set of image data $I_1$ for pixels on a scanning line and image data $I_2$ for pixels on a subsequently selected scanning line. These data are converted into binary signals by an A/D converter 22. The binary signals are divided through a controller 23 to scanning signals and data signals supplied to a scanning side drive circuit and a data side drive circuit. The data side drive circuit includes a data signal generator circuit 24 for determining $Vj_2$ ($V_2$ for pixels on a j-th scanning line) from the image data $I_2$ and a data signal generator circuit for determining $Vj_1$ ($V_1$ for pixels on the j-th scanning line) from $Vj_2$ and $I_1$. These data signals are supplied through a data side shift register 26, a decoder 27 and an analog switch 28 to the liquid crystal panel 32.

The scanning side drive circuit includes a scanning side shift register 29, a decoder 30 and an analog switch 31, through which scanning selection signal are supplied to scanning lines constituting the liquid crystal panel 32 based on scanning line address data.

Another suitable embodiment of the liquid crystal apparatus according to the present invention may include a liquid crystal device having a structure as shown in FIG. 6 including a film 54 between the electrode and the liquid crystal layer, which film is characterized by a volume resistivity of at most $10^8$ ohm.cm and drive means suitable for causing partial inversion in a pixel. The driving may preferably be performed by the pixel shift method, the four pulse method and the random pixel shift method described above.

The film disposed between the electrode and the liquid crystal layer used in the liquid crystal apparatus of the present invention is characterized by having a volume resistivity of at most $10^8$ ohm.cm, preferably $\mathbf{10^4}$–$\mathbf{10^7}$ ohm.cm. In case where the film has a volume resistivity of below $\mathbf{10^4}$ ohm.cm, an electrical continuity between the pixels cannot be ignored, so that it becomes necessary to pattern the film similarly as the electrode. It is desired that the film has a thickness of at most 2000 Å, preferably at most 1000 Å.

The film may preferably comprise a known alignment film material, such as polyimide or polysiloxane, containing conductive or semiconductive fine particles, such as those of $SnO_2$ and $In_2O_3$, therein. Alternatively, the film may have a laminar structure comprising at least two layers including an alignment film of an organic conductor, such as polypyrrole, polyaniline or polyacetylene, or a known organic insulating alignment film material, such as polyimide, on the liquid crystal side; and an inorganic film layer of a conductive or semiconductor material such as $Sn_xO_y$, $In_xO_y$ or a composite of these, or an inorganic insulating material on the electrode side.

The film may have an appropriate composition, dopant content or thickness ratio so as to provide a volumetric resistivity of at most $10^8$ ohm.cm, preferably $10^4$–$10^7$ ohm.cm. The volumetric resistivity VR of a laminate film may be calculated as follows:

$$VR=(VR_1\cdot t_1+VR_2\cdot t_2+\ldots)/(t_1+t_2\ldots),$$

wherein $VR_1$, $R_2$ . . . denote the volumetric resistivities of the materials constituting the component layers and $t_1$, $t_2$ . . . denote the thicknesses of the component layers.

Figure 19:
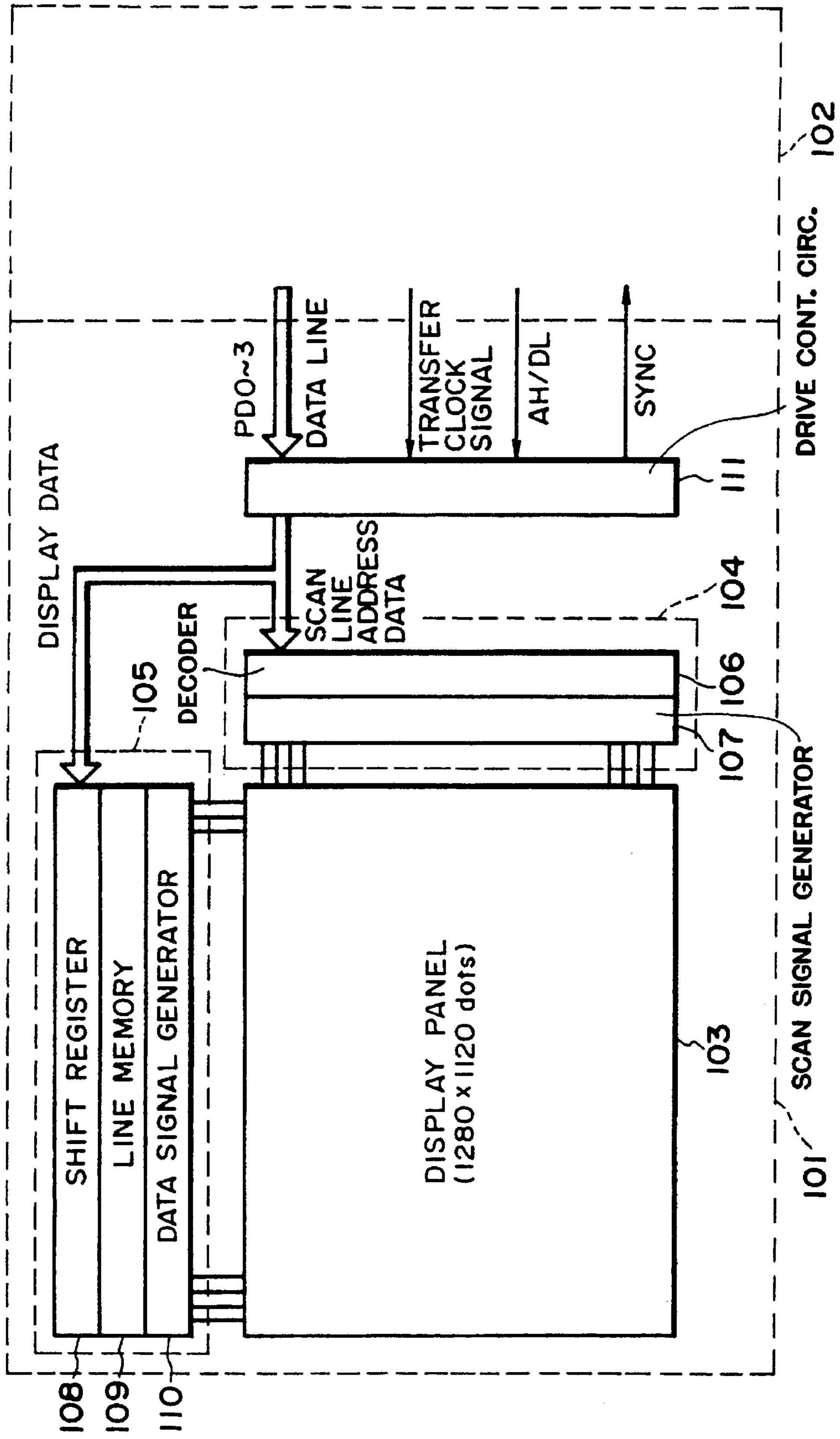
FIG. 19 is a block diagram of a liquid crystal display apparatus according to another embodiment of the present invention.

The liquid crystal device having such a film between the electrode and the liquid crystal layer, preferably on both substrates, may be included as a display panel 103 in an liquid crystal apparatus as represented by a block diagram shown in FIG. 19.

Figures 20A, 20B, 20C, 20D, 20E, 20F:
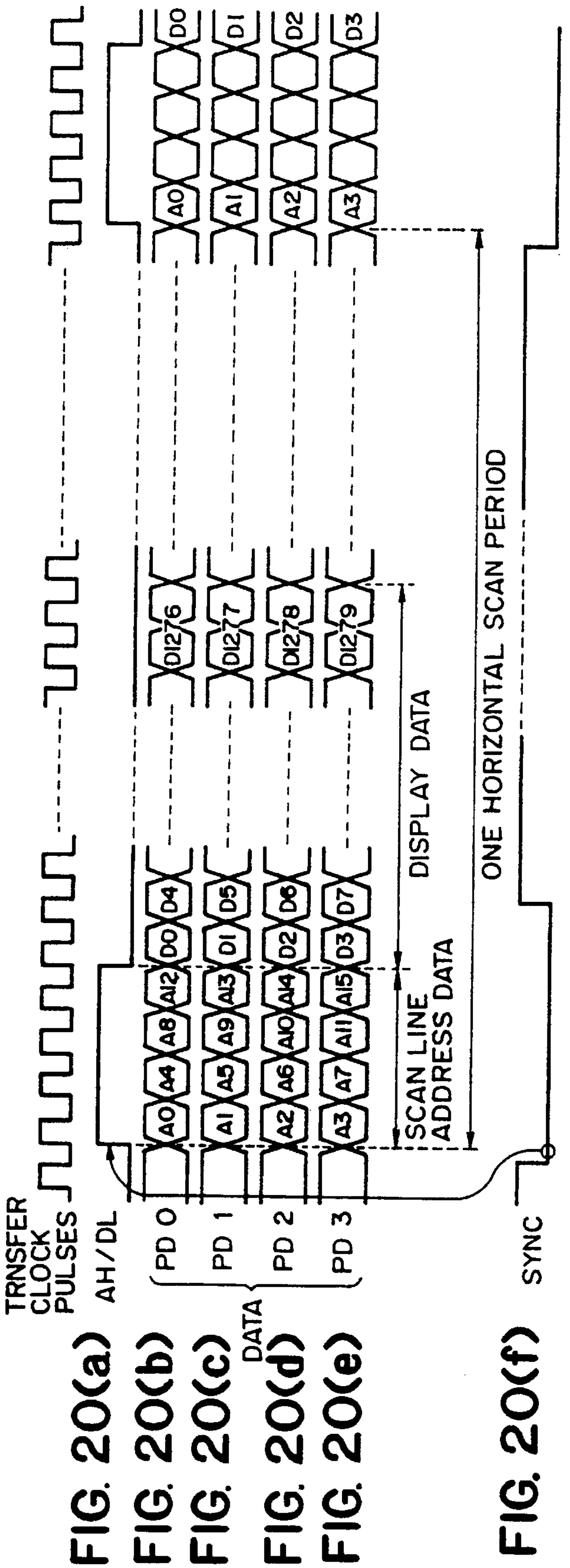
FIGS. 20(*a*)–(*f*) constitute a time chart for controlled drive of the apparatus shown in FIG. 19.

More specifically, FIG. 19 is a block diagram of a control system for a liquid crystal display apparatus as an embodiment of the liquid crystal apparatus according to the present invention, and FIG. 20 is a time chart for communication of image data therefor. Hereinbelow, the operation of the apparatus will be described with reference to these figures.

A graphic controller 102 supplies scanning line address data for designating a scanning electrode and image data PD0–PD3 for pixels on the scanning line designated by the address data to a display drive circuit constituted by a scanning line drive circuit 104 and a data line drive circuit 105 of a liquid crystal display apparatus 101. In this embodiment, scanning line address data (A0–A15) and display data (D0–D1279) must be differentiated. A signal AH/DL is used for the differentiation. The AH/DL signal at a high (Hi) level represents scanning line address data, and the AH/DL signal at a low (Lo) level represents display data.

The scanning line address data is extracted from the image data PD0–PD3 in a drive control circuit 111 in the liquid crystal display apparatus 101 outputted to the scanning line drive circuit 104 in synchronism with the timing of driving a designated scanning line. The scanning line address data is inputted to a decoder 106 within the scanning line drive circuit 104, and a designated scanning electrode within a display panel is driven by a scanning signal generation circuit 107 via the decoder 106. On the other hand, display data is introduced to a shift register 108 within the data line drive circuit 105 and shifted by four pixels as a unit based on a transfer clock pulse. When the shifting for 1280 pixels on a horizontal one scanning line is completed by the shift register 108, display data for the 1280 pixels are transferred to a line memory 109 disposed in parallel, memorized therein for a period of one horizontal scanning period and outputted to the respective data electrodes from a data signal generation circuit 110.

Further, in this embodiment, the drive of the display panel 103 in the liquid crystal display apparatus 101 and the generation of the scanning line address data and display data in the graphic controller 102 are performed in a non-synchronous manner, so that it is necessary to synchronize the graphic controller 102 and the display apparatus 101 at the time of image data transfer. The synchronization is performed by a signal SYNC which is generated for each one horizontal scanning period by the drive control circuit 111 within the liquid crystal display apparatus 101. The graphic controller 102 always watches the SYNC signal, so that image data is transferred when the SYNC signal is at a low level and image data transfer is not performed after transfer of image data for one scanning line at a high level. More specifically, referring to FIG. 19, when a low level of the SYNC signal is detected by the graphic controller 102, the AH/DL signal is immediately turned to a high level to start the transfer of image data for one horizontal scanning line. Then, the SYNC signal is turned to a high level by the drive control circuit 111 in the liquid crystal display apparatus 101. After completion of writing in the display panel 103 with lapse of one horizontal scanning period, the drive control circuit 111 again returns the SYNC signal to a low level so as to receive image data for a subsequent scanning line.

EXAMPLE 1

As a first embodiment, a liquid crystal cell having a sectional structure as shown in FIG. 6 was prepared. The lower glass substrate 53 was provided with a saw-teeth shape cross section by transferring an original pattern formed on a mold onto a UV-curable resin layer applied thereon to form a cured acrylic resin layer 52.

The thus-formed UV-cured uneven resin layer 52 was then provided with stripe electrodes 51 of ITO film by sputtering and then coated with an about 300 Å-thick alignment film 54 (formed with "LQ-1802", available from Hitachi Kasei K.K.).

The opposite glass substrate 53 was provided with stripe electrodes 51 of ITO film on a flat inner surface and coated with an identical alignment film 54.

Both substrates (more accurately, the alignment films 54 thereon) were rubbed respectively in one direction and superposed with each other so that their rubbing directions were roughly parallel but the rubbing direction of the lower substrate formed a clockwise angle of about 6 degrees with respect to the rubbing direction of the upper substrate. The cell thickness (spacing) was controlled to be from about 1.10 μm as the smallest thickness to about 1.64 μm as the largest thickness. Further, the lower stripe electrodes 51 were formed along the ridge or ripple (extending in the thickness direction of the drawing) so as to provide one pixel width having one saw tooth span. Thus, rectangular pixels each having a size of 300 82 m×200 μm were formed.

Then, the cell was filled with a chiral smectic liquid crystal showing the following phase transition series and properties.

TABLE 1

| (liquid crystal) | | | | |
|---|---|---|---|---|
| Iso. | 82.3° C. → / ← 81.8° C. | Ch | 76.6° C. → / ← 77.3° C. | |
| | | SmA* | 54.8° C. → / ← | SmC* |
| | | | −2.5° C. (up) / −20.9° C. (down) | |
| | | | | Cryst |

$Ps = -5.8\ nC/cm^2$ (30° C.)

Tilt angle=14.3 deg. (30° C.)

$\Delta\epsilon \approx -0$ (30° C.)

The liquid crystal cell (device) thus prepared was driven by applying a set of drive signals shown in FIG. 11. The respective pulses were characterized by parameters of $t_1=150$ μsec, $t_2=40$ μsec, $Vs_0=7.0$ volts, $Vs_1=13.1$ volts, $Vs_2=6.9$ volts, $-3.1$ volts$\leqq Vi_1 \leqq 3.1$ volts, $-1.41$ volts$\leqq Vi_2 \leqq 1.41$ volts.

Figure 21:
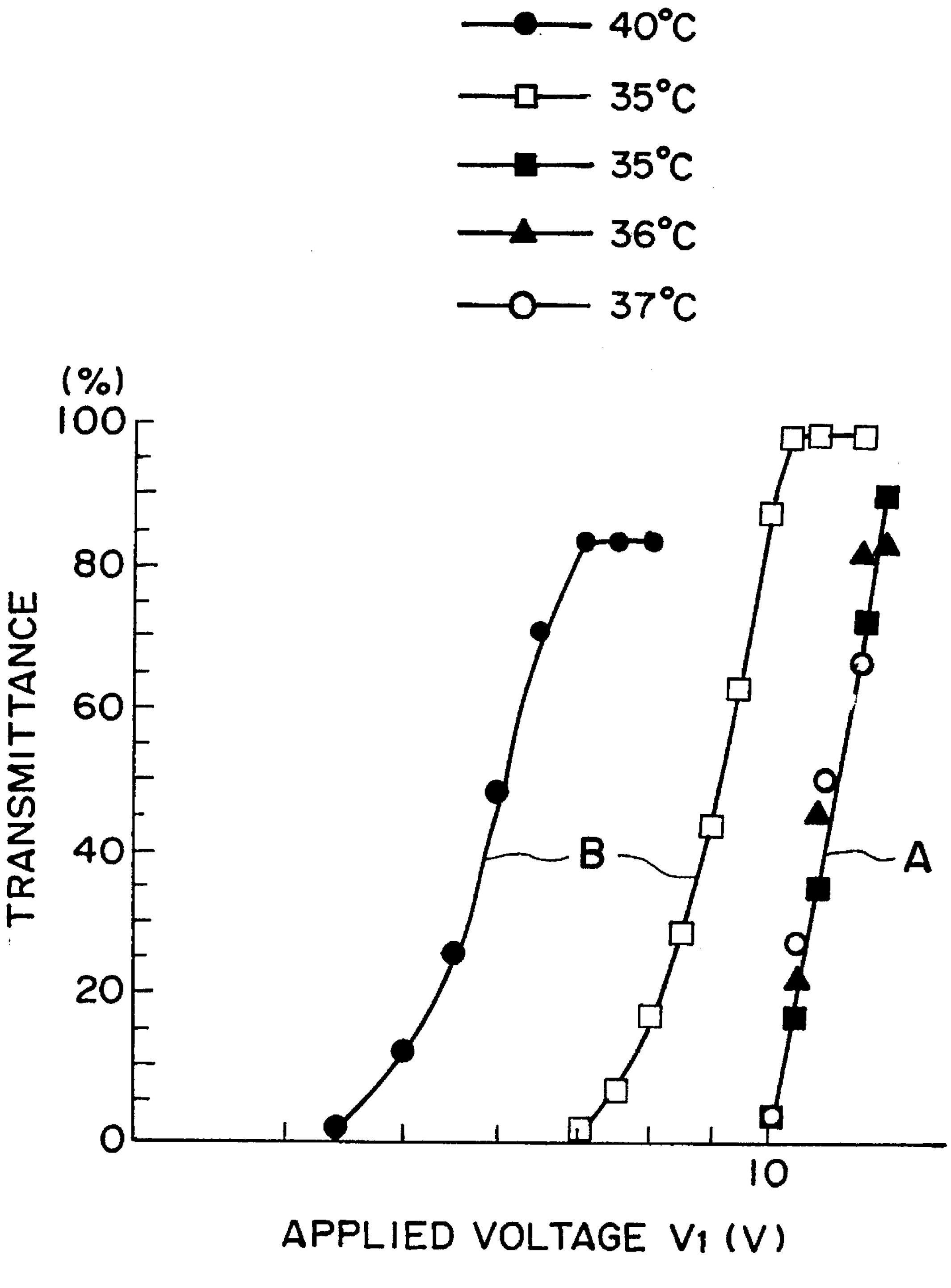
FIG. 21 is a graph showing the results of Example 1 of the present invention appearing hereinafter.

The liquid crystal device driven in the above-described manner showed a display characteristic represented by a curve A in FIG. 21 wherein the abscissa represents $V_1$32 $Vs_1-Vi_1$ and the ordinate represents a relative transmittance (%).

On the other hand, when the same device was driven in the same manner by using driving waveforms shown in FIG. 11 while omitting the pulses corresponding to the selection signal (c) (i.e., $Vs_2=0$ and $Vi_2=0$), the device showed the display characteristics represented by curves B in FIG. 21. Thus, in this case, the resultant transmittances were remarkably different depending on a temperature change, thus failing to show a good gradation characteristic.

In contrast thereto, the curve A obtained according to the drive method of the present invention showed a good gradation characteristic with temperature compensation. Incidentally, a better gradation display characteristic with less influence by a subsequent data signal was obtained when a longer interval period (Y in FIG. 11) was placed between successively applied data signals, and a particularly good result was attained when Y was about 200 μsec.

EXAMPLE 2

Figure 22:
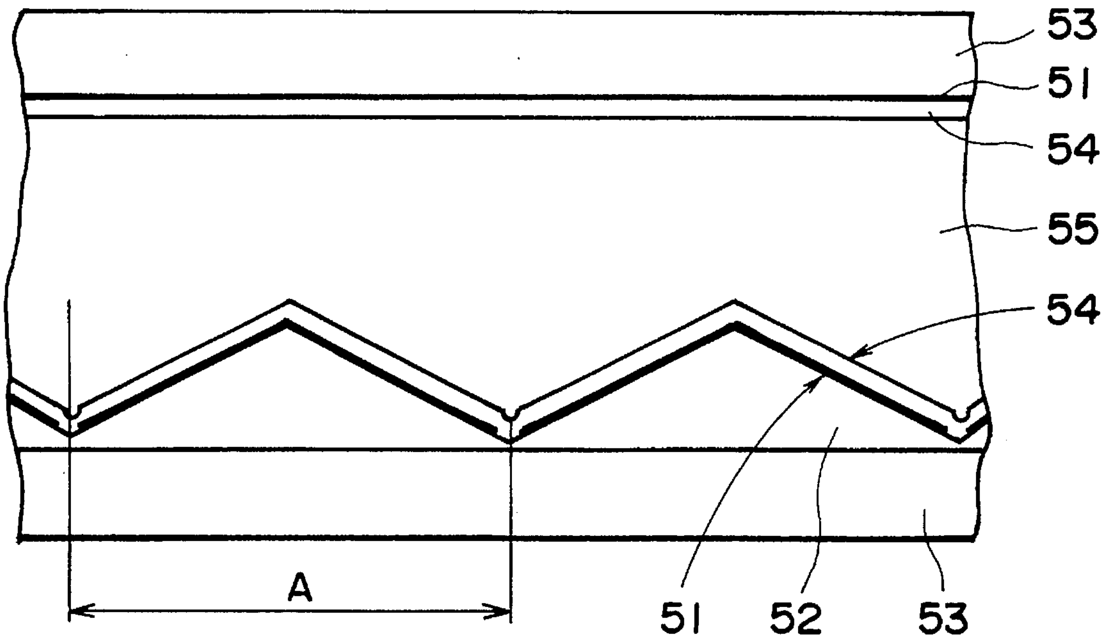
FIG. 22 is a sectional view of a liquid crystal device used in Example 2.

A liquid crystal cell (device) having a cell thickness gradient as shown in FIG. 22 was obtained in a similar manner as in Example 1 except that the cell thickness distribution was in the range of 1.0–1.4 μm, and the rubbing directions applied to the two substrates were set to cross at an angle of about 10 degrees in addition to the change in the sectional structure. The device was driven by applying a set of drive signals as shown in FIG. 11 by using a circuit as shown in FIG. 18.

Figure 23:
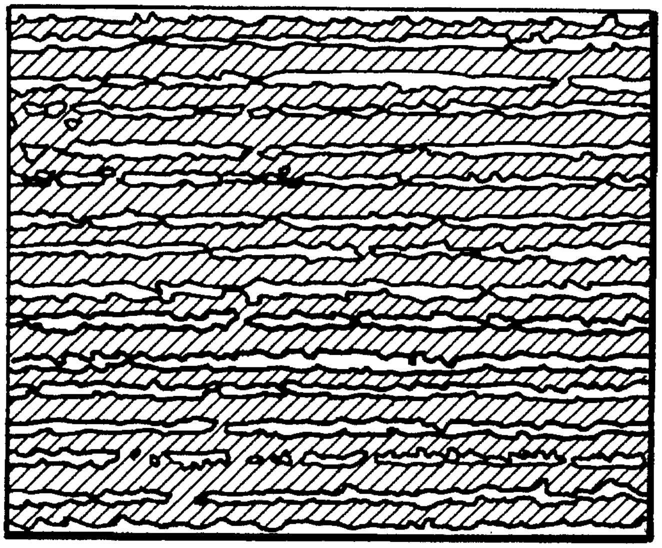
FIG. 23 is an illustration of a display state obtained in Example 2.

The liquid crystal device used in this Example included pixels formed by scanning lines 54 each having a width A as shown in FIG. 22, so that it could not cause a complete pixel shift as described hereinabove. However, as the brightness control could be effected in the device, a temperature compensation could be effected according to the driving method of the present invention. FIG. 23 schematically show a display state formed in this Example.

In each of the above-described Examples 1 and 2, the gradational display drive was effected by voltage modulation, but the modulation can also effected by either pulse width modulation or phase modulation.

EXAMPLE 3

In Example 1, the best result was obtained when the length of Y was set to about 200 μsec. In this Example, it was tried to shorten the period Y by applying a crosstalk prevention signal determined based on a data signal. The other features were identical to those adopted in Example 1.

Figure 24A:
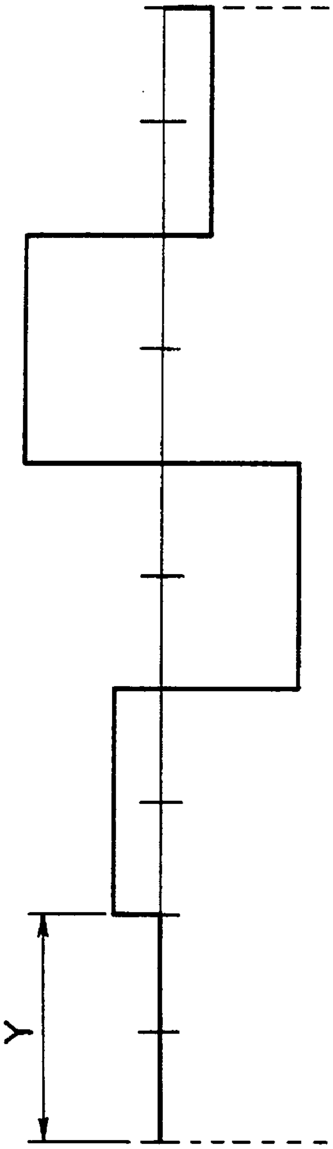
FIG. 24(*a*)–(*g*) constitute an illustration of conditions adopted in Example 3.

In order to produce a crosstalk prevention signal, the effect of pulses applied immediately after the $Vs_2$ pulse in the waveform shown in FIG. 11 is examined with time. FIG. 24 summarizes the analysis.

FIG. 24(*a*) shows a waveform except for the period Y. At (b) are shown addresses of the waveform. At (c) are shown experimentally measured effect factors obtained when the waveform at (a) was applied subsequent to the $Vs_2$ pulse. At (d) are shown example voltages of pulses included in the waveform at (a). These values are determined based on image data for a pixel on a scanning line concerned and image data for an adjacent pixel on an adjacent scanning line similarly as in Example 1. At (e) are shown values obtained by dividing the values at (d) with the values at (c). If the applied voltages at the period Y are assumed to be $V_{Y1}$ and $V_{Y2}$, the effects thereof are shown as $V_{Y1}/3$ and $V_{Y2}/7$, respectively.

The total of the values at (e) from Address 3 to Address 10 amounts to 0,037. This value may be reduced to zero by adjusting the voltages within the period Y. The values of $V_{Y1}$ and $V_{Y2}$ therefor must satisfy the following conditions:

$$(V_{Y1}/3)+(V_{Y2}/7)=-0.0037$$

$$V_{Y1}=-V_{Y2}$$

By solving the above equations, $V_{Y1}$ and $V_{Y2}$ are obtained as follows:

$$V_{Y1}=-0.2 \text{ volt}$$

$$V_{Y2}=0.2 \text{ volt}$$

By determining the waveform within the period Y in the above-described manner, it is possible to accomplish a good gradational display with less crosstalk.

EXAMPLE 4

A liquid crystal cell (device) having a sectional structure also as shown in FIG. 6 was prepared in the following manner. The lower glass substrate 53 was provided with a saw-teeth shape cross section by transferring an original pattern formed on a mold onto a UV-curable resin layer applied thereon to form a cured acrylic resin layer 52.

The thus-formed UV-cured uneven resin layer 52 was then provided with stripe electrodes 51 of ITO film by sputtering and then coated with a film 54, which was formed by applying a solution of polyaniline (molecular weight=ca. 200–300) and camphor-sulfonic acid (as a strong acid) at concentrations of 0.7 wt. % and 0.3 wt. %, respectively in a mixture solvent of N-methylpyrrolidone and n-butylcellosolve by spinner coating at 1500 rpm for 20 sec, followed by baking at 200° C. for 1 hour.

The opposite glass substrate 53 was provided with stripe electrodes 51 of ITO on a flat inner surface and coated with an identical polyaniline film 54 in the same manner as above.

As a result of separate formation of an identical film 54 under the same conditions as above on a flat ITO coated glass substrate, the film 54 showed a thickness of ca. 400 Å and a volume resistivity of ca. $10^7$ ohm.cm.

The two-substrates were subjected to rubbing in the same manner as in Example 1. Further, by using the above-treated two substrates and the same liquid crystal material as in Example 1, a liquid crystal device including pixels each having a size of 300 μm x 200 μm was prepared otherwise in the same manner as in Example 1.

FIG. 25 is a waveform diagram showing a set of driven signal waveforms used in this Example including scanning signals applied to scanning lines $S_1, S_2, S_3, \ldots$, data signals applied to a data line I, and a combined voltage signal applied to a pixel $S_2$–I (i.e., a pixel at the intersection of the scanning line, and the data line I).

In this Example, a gradation drive scheme according to the pixel shift method was adopted, so that adjacent two scanning lines were supplied with scanning signals having mutually reverse polarities at corresponding phases.

Referring to FIG. 25, the respective pulses were characterized by parameters of $|Ve|=18.0$ volts, $|Vs|=17.0$ volts, $|Vi|=5.0$ volts, T=40 μsec, δ=26 μsec, $t_1=7$ μsec and $t_2=7$ μsec.

Figure 26A:
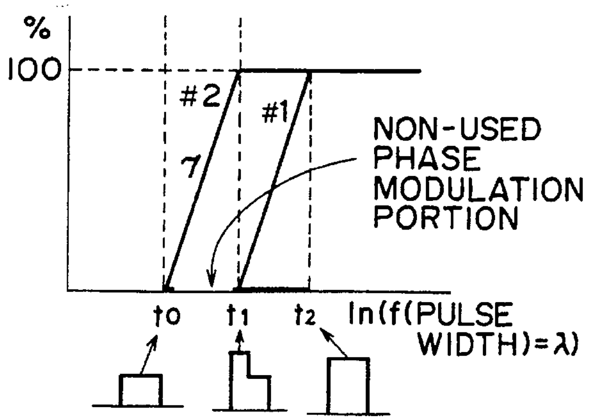
FIGS. 26A and 26B illustrate a manner of constituting data signals in the waveform shown in FIG. 25.
Figure 26B:
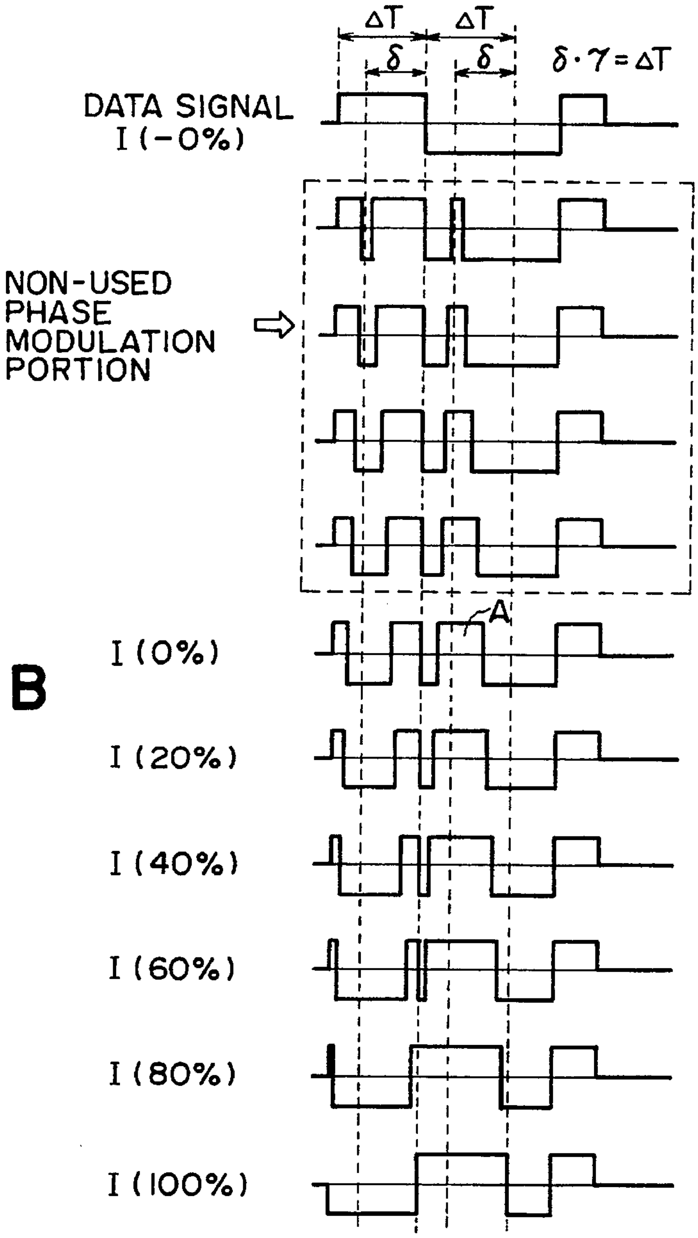

The data signal modulation was effected according to a phase modulation scheme, and an outline of the data signal modulation is illustrated in FIG. 26B. FIG. 26B shows data signal voltage waveforms in the range of I (0%) to I (100%) for displaying the states respectively indicated in the parentheses. In the respective data signals, the width of a pulse portion A is variably modulated so as to provide a voltage signal having a width δ with writing data. The modulation of the portion A is set so that the width δ and the marginal width of the ΔT have a ratio of $1/\gamma:(1-1/\gamma)$.

Such a ratio is set so as to make continuous the thresholds of inversion at a pixel which has been supplied with a scanning signal A in the first writing and a scanning signal B in the second writing in FIG. 25. The width δ is $1/\gamma$ of the selection period ΔT of the scanning signal A. This condition is also given in order to make the thresholds continuous. Herein, γ denotes a slope $\partial T/\partial \lambda$ on a curve shown on a coordinate system having an ordinate of transmittance (T) and an abscissa of modulation parameter (λ) as shown in FIG. 16A.

Figure 27A:
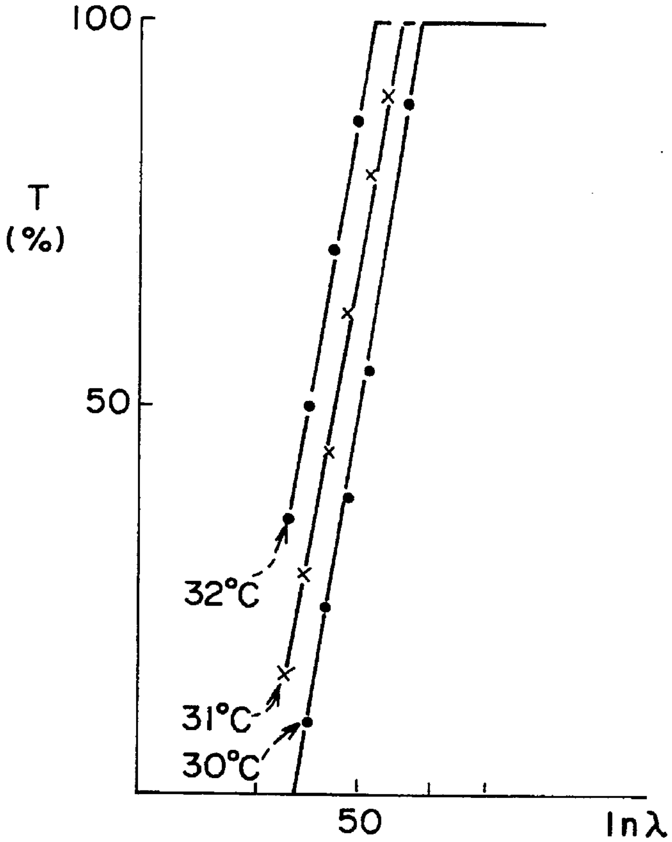
FIG. 27A shows plots of a relationship between transmittance and a modulation parameter.
Figure 27B:
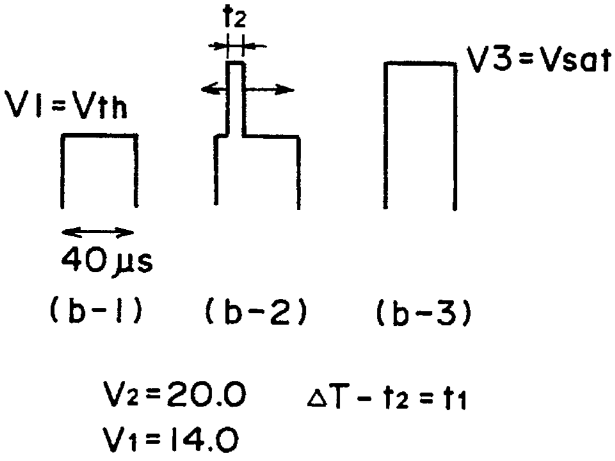
FIG. 27B illustrates voltage signals involved in the waveform shown in FIG. 25.

Now, the modulation parameter (λ) will be described. FIG. 27 shows a graph showing a relationship between transmittance (T) and modulation parameter (λ). In the case of using a modulation scheme as shown in FIG. 26B, the abscissa is expressed on a logarithmic scale (ln) so as to represent the change in threshold of a liquid crystal by a parallel shift on the graph. In the drive scheme shown in FIG. 25, the voltage applied to a pixel corresponding to a scanning selection pulse A in a scanning signal varies in a range of from a rectangular voltage of $V_1$=Vth=14 volts (as shown at (b-1) of FIG. 27B) to a rectangular voltage of $V_3$ =Vsat=20 volts (at (b-3) of FIG. 27B).

Then, if a modulation parameter (λ) is defined as a period (pulse width) weighed (e.g., multiplied) by a (varying) voltage, it is possible to obtain a relationship between transmittance (T)–lnλ which is linear and may be shifted in parallel in accordance with a temperature change.

The manner of weighing with a voltage (peak value) is explained based on an example. A pulse having a portion showing a peak value $V_1$ in a pulse length of $t_1$ (in total if two portions having $V_1$ are present) and a portion having a peak value $V_2$ in a pulse length $t_2$ may be determined to have a modulation parameter given by:

$$\lambda=(V_2/V_1)\cdot t_1+t_2.$$

In case of FIG. 27B, $t_1+t_2$=40 μsec, $V_1$=14 volts and $V_2$=20 volts.

If λ is determined in this way under the conditions of FIGS. 25 and 26, the selection voltage waveform varies in the range of from an L-shaped one having a portion of 10 volts–32 μsec and a portion of 22 volts–8 μsec to a rectangular one having a 100 %-portion of 22 volts–40 μsec.

The above range is used for gradational display and a pulse of 10 volts–40 μsec is used for display of 0%. The latter corresponds to a voltage waveform given by a data signal I (–0%) in FIG. 26B.

By disposing a low-resistivity film layer between the liquid crystal and the electrode as described above, it was possible to increase the stability of domain walls in a pixel during plural times of writing for a pixel, and also possible to provide an increased degree of additivity in temperature compensation.

Figures 10A, 10B, 10C, 10D:
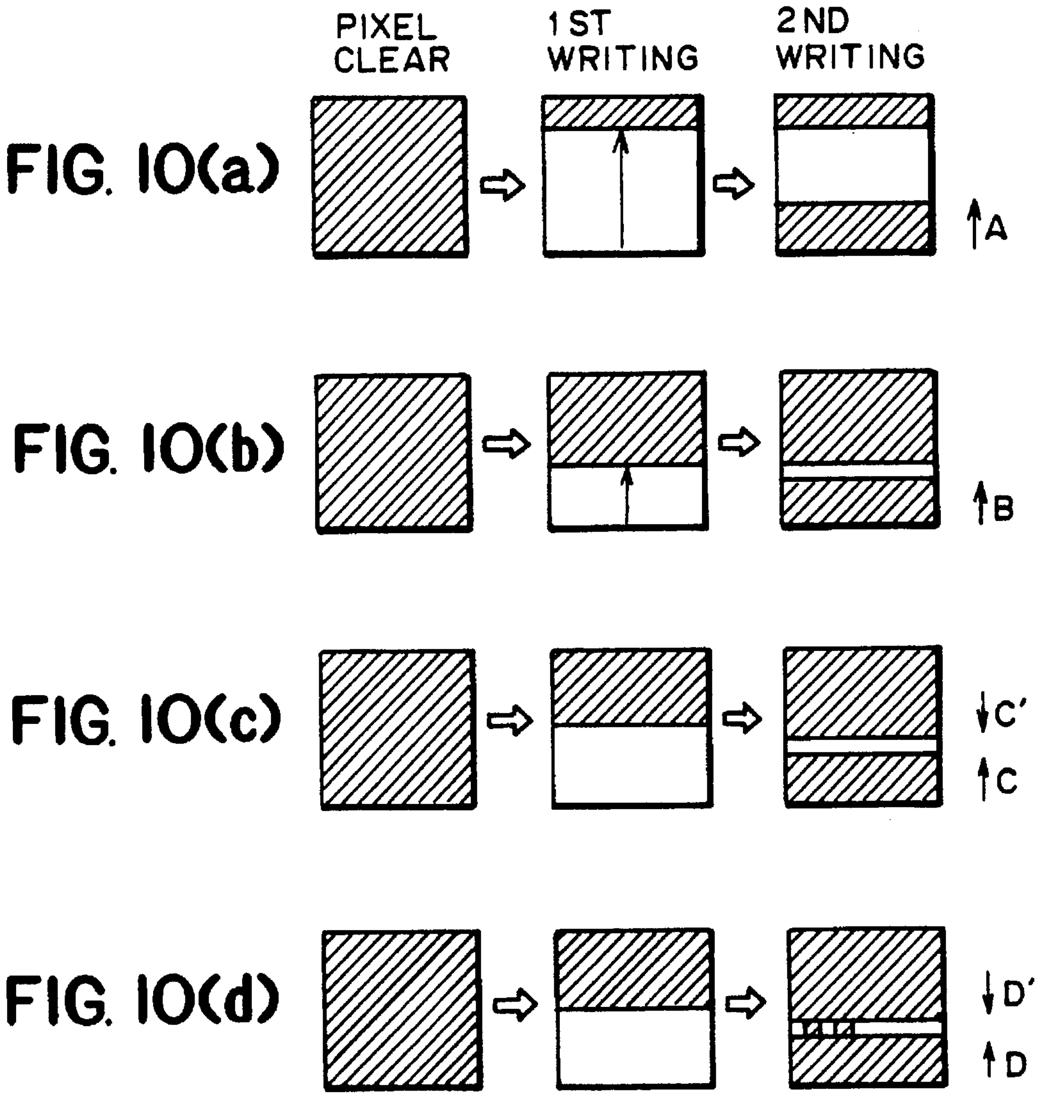
FIGS. 10(*a*)–(*d*) constitute an illustration of instability of domain walls observed.
Figure 11A:
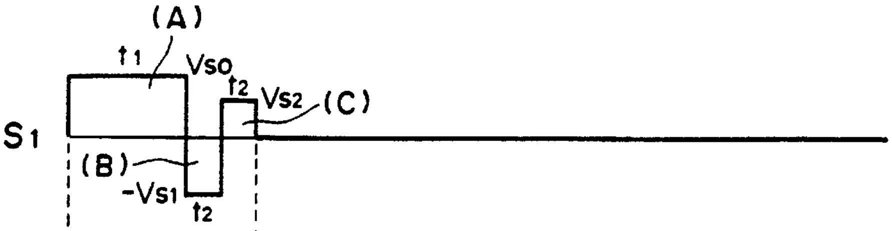
FIGS. 11(*a*)–(*d*) constitute a waveform diagram showing a set of drive signals according to an embodiment of the present invention.
Figure 11B:
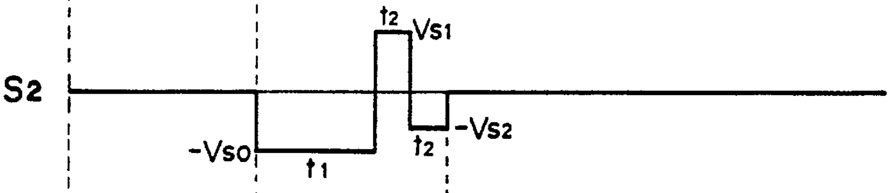
Figure 11C:
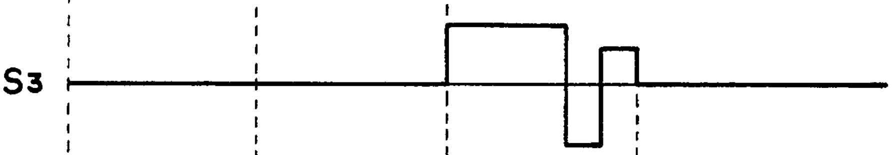
Figure 11D:
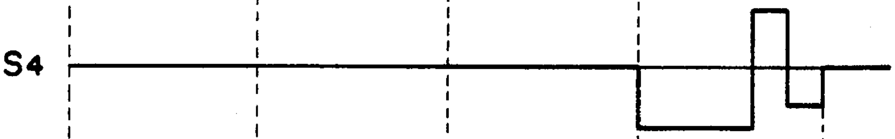
Figure 11E:
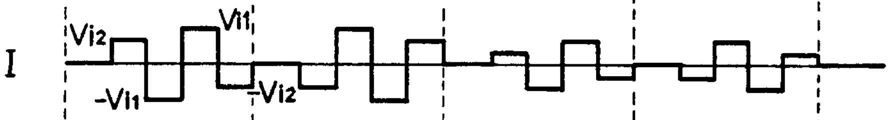
Figure 11F:
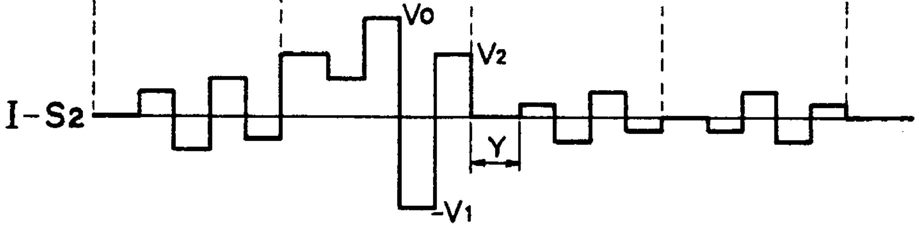

Further, the irregular movement of domain wall and fusion or connection of domain walls as described with reference to FIG. 10(*c*) and (*d*) were prevented until the spacing between domain walls was reduced to 10–20 μm, compared with 20–30 μm as in a conventional device. Further, the number of reliably displayed gradation levels could be increased from about 8 to about 13, thus providing a remarkably improved gradational display characteristic.

EXAMPLE 5

Figure 28:
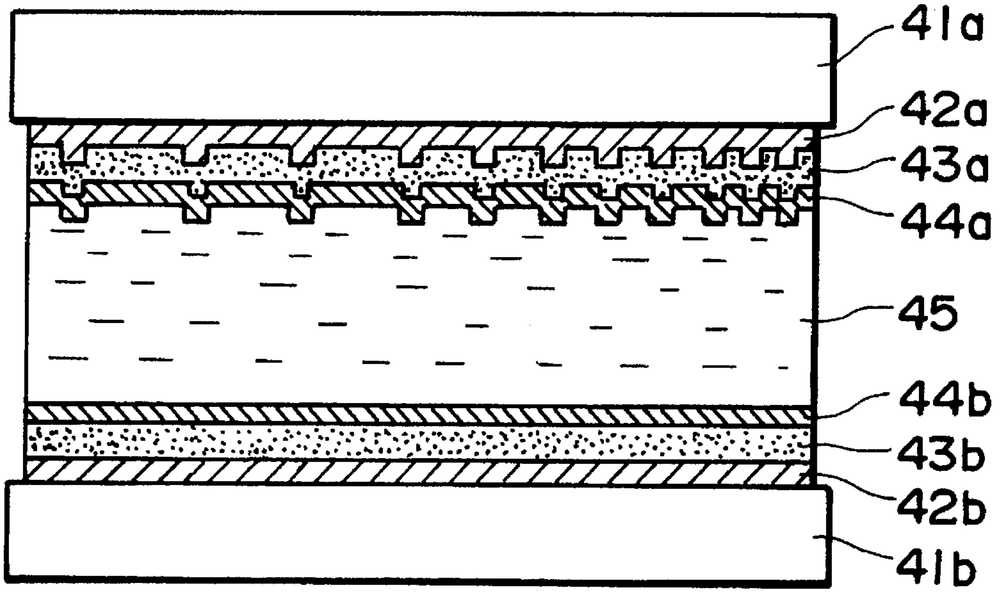
FIG. 28 is a sectional view showing a structure of liquid crystal device according to another embodiment of the present invention.

A liquid crystal cell having a sectional pixel structure as schematically shown in FIG. 28 was prepared. The cell included an uneven substrate structure including a glass substrate 41*a*, an uneven ITO film 32*a*, an $SnO_2$ layer 43*a* and a polyaniline layer 44*a*; an even substrate structure including a glass substrate 41*a*, an ITO film 42*b*, an $SnO_2$ layer 43*b* and a polyaniline layer 44*b*; and an FLC layer 45 disposed between the substrates.

The ITO film 42*a* was provided with ca. 2 μm-wide stripe projections extending in the direction of thickness of the drawing which were spaced thee different pitches of 2 μm, 3 μm and 5 μm laterally from one side to the other side.

The $SnO_2$ films 43*a* and 43*b* were formed in a thickness of 900 Å by ion plating at a rate of 6 Å/sec in an $Ar/O_2$ (100/70) mixture environment under the conditions, the resultant $SnO_2$ film showed a volume resistivity of ca. $10^5$ ohm.cm. Such an $SnO_2$ film may also be formed by sputtering in a volume resistivity of, e.g., $10^6$–$10^7$ ohm.cm.

The thus formed $SnO_2$ film 43*a* and 43*b* were coated with polyaniline layers 44*a* and 44*b*, respectively, in a thickness of ca. 100 Å each, in the same manner as in Example 4. The resultant laminate film including the $SnO_2$ film and the polyaniline film showed a volume resistivity of $1.5\times10^7$ ohm.cm.

The resultant polyaniline layer 44*a* on the uneven substrate was provided with stripe projections of ca. 2000 Å in height corresponding to the uneven ITO film 42*a* and rubbed in a direction of the stripe projections. The polyaniline layer 44*b* on the other even substrate was also rubbed in one direction. The two substrates were applied to each other with $SiO_2$ spacer beads (of 1.4 μm-dia.) dispersed therebetween so that the rubbing direction on the even substrate formed a clockwise angle of 10 degrees with respect to the rubbing direction of the uneven substrate as viewed from the uneven substrate.

The resultant blank cell was filled with the same liquid crystal material as in Example 1 to form a liquid crystal cell.

The thus-formed liquid crystal cell was found to show a gradational display characteristic such that domain inversion was initiated from a side of pitches being formed with a small spacing (2 μm) and propagated toward the other side in a pixel. At a pulse width ΔT=40 μsec, the inversion was partly initiated at V=18 volts and 100% inversion was caused at 22 volts, thus showing a threshold distribution rate of 1.22.

By forming an electroconductive primary layer ($SnO_2$ layer) below the alignment layer as described above, the domain stability was improved. When the device was subjected to a matrix drive by application of waveforms shown in FIG. 25, disappearance of small domains (2 μm or smaller in diameter) was suppressed and the stability of domains were increased against plural times of writing in a pixel, thus providing an improved display characteristic.

As described hereinabove, a gradational display system capable of correcting a temperature-dependent deviation and also capable of interlaced scanning drive is provided by applying specific sequential pulses after a clearing pulse. As a result, it has become possible to realize a good gradational display with reduced flicker and contrast irregularity.

Further, in a liquid crystal apparatus according to the present invention using a liquid crystal device wherein a low-resistivity film layer is disposed between the liquid crystal layer and the electrode, the stability of liquid crystal molecules in the vicinity of domain walls formed by partial inversion in a pixel is improved, thereby realizing a more accurate and stable gradational display while performing temperature compensation.

What is claimed:

1. A driving method for a liquid crystal device of a type comprising a pair of oppositely disposed electrode plates having thereon a group of scanning lines and a group of data lines, respectively, and a ferroelectric liquid crystal disposed between the pair of electrode plates so as to form a pixel at each intersection of the scanning lines and data lines, said driving method comprising the steps of:

in a selection period for an N-th selected scanning line, to a first pixel at an intersection of the N-th selected scanning line and a prescribed data line, applying a first reset pulse of a first polarity for resetting the first pixel to its brightest or darkest state, then a first writing pulse of a second polarity opposite to the first polarity and then a first correction pulse of the first polarity; and in a selection period for an N+1-th selected scanning line, to a second pixel at an intersection of the N+1-th selected scanning line and the prescribed data line, applying a second reset pulse of the second polarity for resetting the second pixel to its darkest or brightest state, then a second writing pulse of the first polarity and then a second correction pulse of the second polarity, wherein:

(a) the first writing pulse is set corresponding to gradation data to be displayed at the first pixel on the N-th selected scanning line, (b) the first correction pulse is set corresponding to gradation data to be displayed at the second pixel on the N+1-th selected scanning line, (c) the second writing pulse is set corresponding to gradation data to be displayed at the second pixel on the N+1-th selected scanning line, (d) the second correction pulse is set corresponding to gradation data to be displayed at a third pixel at an intersection of an N+2-th selected scanning line and the prescribed data line, and (e) the selection periods for the N-th and N+1-th selected scanning lines do not overlap each other.

2. A driving method for a liquid crystal device of a type comprising a pair of oppositely disposed electrode plates having thereon a group of scanning lines and a group of data lines, respectively, and a chiral smectic liquid crystal disposed between the pair of electrode plates so as to form a pixel at each intersection of the scanning lines and data lines, said driving method comprising the steps of:

in a selection period for an N-th selected scanning line, to a first pixel at an intersection of the N-th selected scanning line and a prescribed data line, applying a first reset pulse for resetting the first pixel to its brightest or darkest state, then a first writing pulse and then a first correction pulse; and in a selection period for an N+1-th selected scanning line, to a second pixel at an intersection of the N+1-th selected scanning line and the prescribed data line, applying a second reset pulse for resetting the second pixel to its darkest or brightest state, then a second writing pulse and then a second correction pulse, wherein:

(a) the first writing pulse is set corresponding to gradation data to be displayed at the first pixel on the N-th selected scanning line, (b) the first correction pulse is set corresponding to gradation data to be displayed at the second pixel on the N+1-th selected scanning line, (c) the second writing pulse is set corresponding to gradation data to be displayed at the second pixel on the N+1-th selected scanning line, (d) the second correction pulse is set corresponding to gradation data to be displayed at a third pixel at an intersection of an N+2-th selected scanning line and the prescribed data line, and (e) the selection periods for the N-th and N+1-th selected scanning lines do not overlap each other.

3. A driving method according to claim 1 or 2, wherein:

the first reset pulse, the first writing pulse and the first correction pulse are applied successively, the second reset pulse, the second writing pulse and the second correction pulse are applied successively, and the second reset pulse is applied immediately after the first correction pulse.

4. A driving method according to claim 1 or 2, wherein the pixel on the N-th or N+1-th selected scanning line is caused to include a mixture of a dark domain and a bright domain of the liquid crystal.

5. A driving method according to claim 1 or 2, wherein the N-th and N+1-th selected scanning lines are not physically adjacent to each other, a later selected scanning line being present therebetween.

* * * * *

UNITED STATES PATENT AND TRADEMARK OFFICE

CERTIFICATE OF CORRECTION

PATENT NO. : 5,592,190

DATED : January 7, 1997

INVENTORS : SHINJIRO OKADA, ET AL.

It is certified that error appears in the above-identified patent and that said Letters Patent is hereby corrected as shown below:

SHEET 2

Figure 4:
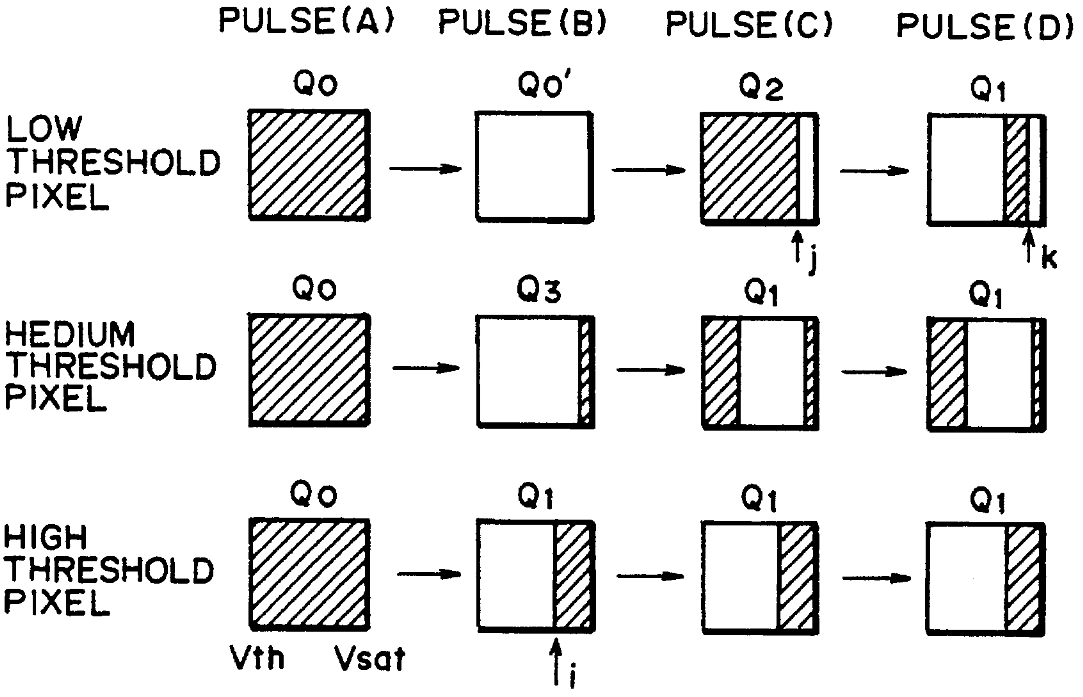
FIG. 4 PRIOR ART
FIG. 4 is an illustration of pixels showing various transmittance levels given in the conventional four-pulse method.
Figure 7A:
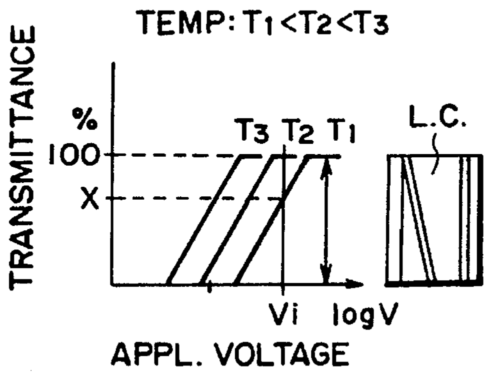
FIG. 7A PRIOR ART
FIGS. 7A–7D are views for illustrating a pixel shift method.
Figure 7B:
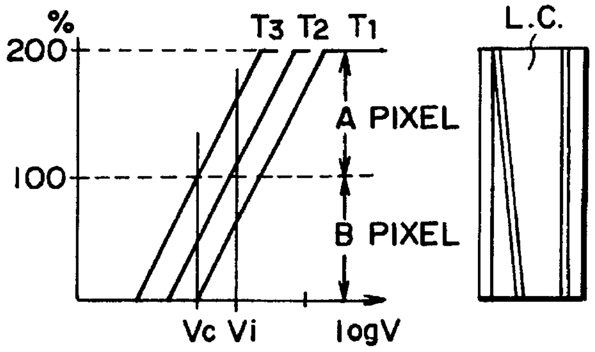
FIG. 7B PRIOR ART
Figure 7C:
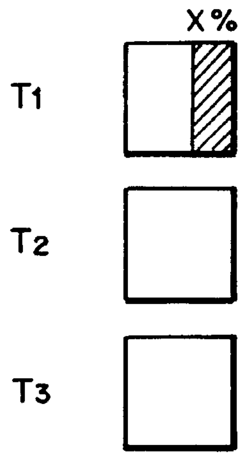
FIG. 7C PRIOR ART
Figure 7D:
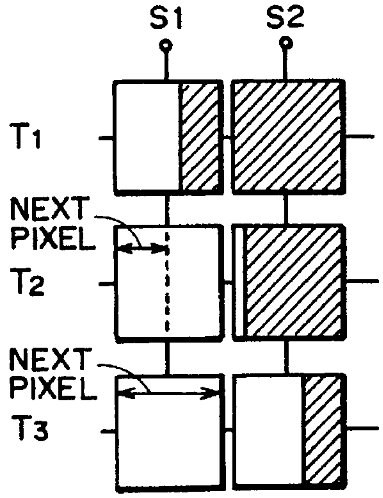
FIG. 7D PRIOR ART

Figure 4, "HEDIUM" should read --MEDIUM--.

SHEET 9

Figure 14, "RE-INVERGION" should read --RE-INVERSION--.

COLUMN 2

Line 56, "fluctuated" should read --fluctuate--;
Line 62, "four" should read --"four--.

COLUMN 4

Line 11, "methods" should read --methods,--

COLUMN 7

Line 38, "unstable" should read --unstable state--

UNITED STATES PATENT AND TRADEMARK OFFICE

CERTIFICATE OF CORRECTION

PATENT NO. : 5,592,190

DATED : January 7, 1997

INVENTORS : SHINJIRO OKADA, ET AL.

It is certified that error appears in the above-identified patent and that said Letters Patent is hereby corrected as shown below:

COLUMN 8

Line 16, "an" should read --a--.

COLUMN 10

LIne 56, "are" should read --is--.

COLUMN 12

Line 15, "$V_{1=}$ 10.08 volts" should read --$V_1$= 10.08 volts--.

COLUMN 13

Line 5, "$\delta W_2$," should read --$\delta W_2'$--;
Line 32, "a shown" should read --as shown--;
Line 35, "possible to" should read --as possible to--;
Line 48, ""whir"" should read --"white"--.

UNITED STATES PATENT AND TRADEMARK OFFICE

CERTIFICATE OF CORRECTION

PATENT NO. : 5,592,190

DATED : January 7, 1997

INVENTORS : SHINJIRO OKADA, ET AL.

It is certified that error appears in the above-identified patent and that said Letters Patent is hereby corrected as shown below:

COLUMN 14

Line 1, "!" should read --i--;
Line 43, "specifically. Incidentally," should read --specifically,--.

COLUMN 16

Line 57, "an" should read --a--.

COLUMN 18

Line 15, "300 82 mx200 μm" should read --300 μm x 200μm--;
Line 45, "$V_1$ 32" should read --$V_1$ = --.

COLUMN 19

Line 15, "show" should read --shows--;
Line 46, "0,037." should read --0.037.--.

UNITED STATES PATENT AND TRADEMARK OFFICE

CERTIFICATE OF CORRECTION

PATENT NO. : 5,592,190

DATED : January 7, 1997

INVENTORS : SHINJIRO OKADA, ET AL

It is certified that error appears in the above-identified patent and that said Letters Patent is hereby corrected as shown below:

COLUMN 21

Line 59, "thee" should read --three--.

COLUMN 22

Line 1, "film" should read --films--.

Signed and Sealed this

Second Day of September, 1997

Attest:

BRUCE LEHMAN

*Attesting Officer*

*Commissioner of Patents and Trademarks*